United States Patent
Oudeyer

(10) Patent No.: US 7,451,079 B2
(45) Date of Patent: Nov. 11, 2008

(54) EMOTION RECOGNITION METHOD AND DEVICE

(75) Inventor: Pierre-Yves Oudeyer, Paris (FR)

(73) Assignee: Sony France S.A., Clichy (FR)

( * ) Notice: Subject to any disclaimer, the term of this patent is extended or adjusted under 35 U.S.C. 154(b) by 890 days.

(21) Appl. No.: 10/194,848

(22) Filed: Jul. 12, 2002

(65) Prior Publication Data

US 2003/0055654 A1    Mar. 20, 2003

(30) Foreign Application Priority Data

Jul. 13, 2001    (EP)    ................................. 01401879

(51) Int. Cl.
*G10L 21/06*    (2006.01)
*G10L 11/04*    (2006.01)

(52) U.S. Cl. .................. 704/205; 704/207; 704/270

(58) Field of Classification Search .................. None
See application file for complete search history.

(56) References Cited

U.S. PATENT DOCUMENTS

| | | | |
|---|---|---|---|
| 3,855,416 A | | 12/1974 | Fuller |
| 4,142,067 A | * | 2/1979 | Williamson ............... 704/258 |
| 4,441,202 A | * | 4/1984 | Tong et al. ................ 381/326 |
| 4,532,930 A | * | 8/1985 | Crosby et al. .............. 607/57 |
| 5,918,222 A | * | 6/1999 | Fukui et al. ............... 707/1 |
| 6,006,188 A | * | 12/1999 | Bogdashevsky et al. ..... 704/270 |
| 6,101,463 A | * | 8/2000 | Lee et al. .................. 704/207 |
| 6,358,055 B1 | * | 3/2002 | Rothenberg ............... 434/185 |
| 6,577,998 B1 | * | 6/2003 | Yamamoto .................. 704/270 |
| 6,697,457 B2 | * | 2/2004 | Petrushin .................. 379/88.08 |
| 7,065,490 B1 | * | 6/2006 | Asano et al. ................ 704/275 |
| 2003/0023444 A1 | * | 1/2003 | St. John .................... 740/270.1 |
| 2003/0033145 A1 | * | 2/2003 | Petrushin .................... 704/236 |

OTHER PUBLICATIONS

Kim, H. Lee, J. Sung, M. Kim, K. Park, K. "Pitch Detection with Average Magnitude Difference Function Using Adaptive Threshold Algorithm for Estimating Shimmer and Jitter" Proceedings of the 20th Annual International Conference of IEEE Engineering in Medicine and Biology, vol. 6, pp. 3162-3164 1998.*

Database Biosis 'Online! Biosciences Information Service, Philadelphia, PA, US; 1986, Van Bezooijen R et al: "The Effects of Low-Pass Filtering and Random Splicing on the Perception of Speech" XP002289963 Database accession No. PREV198783009008 * abstract * & Journal of Psycholinguistic Research, vol. 15, No. 5, 1986, pp. 403-418, ISSN: 0090-6905.

(Continued)

*Primary Examiner*—David R. Hudspeth
*Assistant Examiner*—Matthew J. Sked
(74) *Attorney, Agent, or Firm*—Oblon, Spivak, McClelland, Maier & Neustadt, P.C.

(57) ABSTRACT

Emotion recognition is performed by extracting a set comprising at least one feature derived from a signal, and processing the set of extracted feature(s) to detect an emotion therefrom. The voice signal is low pass filtered prior to extracting therefrom at least one feature of the set. The cut-off frequency for the low pass filtering is typically centered around 250 Hz. The features are e.g. statistical quantities extracted from sampling a signal of the intensity or pitch of the voice signal.

24 Claims, 13 Drawing Sheets

OTHER PUBLICATIONS

Gudrun Klasmeyer: "An Automatic Description Tool for Time Contours and Long-Term Average Voice Features in Large Emotional Speech Databases" ISCA Workshop on Speech and Emotion, Sep. 5, 2000,-Sep. 7, 2000 pp. 1-6, XP007005767 Belfast.

K.R. Scherer, T. Johnstone, J. Sangsue: "L'état émotionnel du locuteur: facteur néligé mais non négligeable pour la technologie de la parole" Actes Des XXIIIÈMES Journees D'etudes sur la Parole, 1998, pp. 1-9, XP002289960 Martigny, Switzerland.

Sinead McGilloway, Roddy Cowie, Ellen Douglas-Cowie, Stan Gielen, Machiel Westerdijk, Sybert Stroeve: "Approaching Automatic Recognition of Emotion from Voice: a Rough Benchmark" ISCA Workshop on Speech and Emotion, Proceedings Online, Sep. 5, 2000 pp. 1-8, XP002289961 Belfast Retrieved from the Internet: URL:http://www.qub.ac.uk/en/tsca/proceedings/pdfs/mcilloway.pdf> retrieved on Jul. 23, 2004.

McNally Richard J et al: "The voice of emotional memory: Content-filtered speech in panic disorder, social phobia, and major depressive disorder" Behaviour Research and Therapy, vol. 39, No. 11, Nov. 2001, pp. 1329-1337, XP002289962 ISSN: 0005-7967.

* cited by examiner

EMOTION RECOGNITION METHOD AND DEVICE

The present invention relates to the field of emotion recognition, and more particularly to a method and device for detecting an emotion from voice signals. There are now a growing number of applications which require technical means for detecting an emotion conveyed by a human—or possibly synthesised or animal—voice, e.g. to provide a man-machine interface with a more natural and intuitive way of communicating. For instance, robotic pets or humanoids are now developed with a behaviour remarkably similar to that of living creatures. In this context, it is natural that the robot be expected to detect utterances with some basic emotion content, e.g. calm, happiness, sadness, anger, etc. Other applications can be in education, training, speech therapy, human control of equipment, vehicles, tools, etc.

Most work (though not all) undertaken up to present in this area of emotion recognition concentrates on detecting emotions in a text read out by persons, the text generally being paragraphs rather than short utterances. The recitation is performed in well-controlled environments such as acoustic chambers.

Recent years have been marked by the increasing development of personal robots, either used as new educational technologies (cf. Druin A., Hendler J. (2000) "Robots for Kids: Exploring new technologies for learning", Morgan Kauffman Publishers.) or for pure entertainment (cf. Fujita M., Kitano H. (1998) "Development of an autonomous quadruped robot for robot entertainment", Autonomous Robots, 5, and Kusahara M. (2000) "The art of creating subjective reality: an analysis of Japanese digital pets", in Boudreau E., ed., in Artificial Life 7, Workshop Proceedings, pp. 141-144).

Typically, these robots look like familiar pets such as dogs or cats (e.g. the Sony AIBO robot), or sometimes take the form of young children such as the humanoids SDR3-X (Sony).

The interactions with these machines are to be radically different with the way we interact with traditional computers. So far, humans had the habit of learning to use very unnatural conventions and media such as keyboards or dialog windows, and had to have some significant knowledge about the way computers work to be able to use them.

Among the capabilities that these personal robots need, one of the most basic is the ability to have a grasp over human emotions (cf. Picard R. (1997) "Affective Computing", MIT Press), and in particular they should be able both to recognise human emotions and express their own emotions. Indeed, not only emotions are crucial to human reasoning, but they are central to social regulation (cf. Halliday M. (1975) "Learning how to mean: explorations in the development of language", Elsevier, N.Y.) and in particular to the control of dialog flows: orality and gestuality).

Apart from language, we express our emotions to others in two main ways: modulation of facial expression (cf. Ekman, P. (1982) "Emotions in the human face", Cambridge University Press, Cambridge.) and the modulation of the intonation of the voice (cf. Banse, R. and Sherer, K. R., (1996) "Acoustic profiles in vocal emotion expression", Journal of Personality and Social Psychology, 70(3):614-636).

Whereas research on automated recognition of emotions in facial expressions is now very rich (cf. A. Samal, P. Iyengar (1992) "Automatic recognition and analysis of human faces and facial expression: A survey. Pattern Recognition, 25(1): 65—77.), research on speech modality, both for automated production and recognition by machines, has been active only for very few years (cf. Bosh L. T. (2000) "Emotions: what is possible in the ASR framework?", in Proceedings of the ISCA Workshop on Speech and Emotion.).

A starting point in the research is an investigation in acoustic correlates between emotion and its effect on the acoustic characteristics of the corresponding voice signal. A number of researchers have already investigated this question (cf. Fairbanks 1940, Burkhard and Sendlmeier 2000, Banse and Sherer 1996).

Their results agree on the speech correlates that arise from physiological constraints, and which correspond to broad classes of basic emotions, but disagree and are unclear when one looks at the differences between the acoustic correlates of, for instance, fear and surprise, or boredom and sadness. Indeed, certain emotional states are often correlated with particular physiological states (cf. Picard 1997 cited supra) which, in turn, have quite mechanical—and thus predictable—effects on speech, especially on pitch (fundamental frequency F0), timing and voice quality. For instance, when one is in a state of anger, fear or joy, the sympathetic nervous system is aroused, heart rate and blood pressure increase, the mouth becomes dry and there are occasional muscle tremors. Speech is then loud, fast and enunciated with strong high frequency energy. When one is bored or sad, the parasympathetic nervous system is aroused, the heart rate and blood pressure decrease and salivation increases, producing speech that is slow, low-pitched and with little high frequency energy (Breazal, C. (2000) Sociable Machines: "Expressive social exchange between humans and robots", PhD Thesis, MIT AI Lab.).

Furthermore, the fact that these physiological effects are rather universal means that there are common tendencies in the acoustical correlates of basic emotions across different cultures. This has been precisely investigated in studies (cf. Abelin A, Allwood J., (2000) "Cross-linguistic interpretation of emotional prosody", in Proceedings of the ISCA Workshop on Speech and Emotion) or Tickle A. (2000), "English and Japanese speaker's emotion vocalisations and recognition: a comparison highlighting vowel quality", ISCA Workshop on Speech and Emotion, Belfast 2000). In these studies, experiments were conducted e.g. in which American people had to try to recognise the emotion of either another American or a Japanese person just by using acoustic information (the utterances were meaningless, so there was no semantic information).

Japanese people were likewise asked to try to decide which emotions other Japanese or American people were trying to convey. Two results came out from these studies: 1) there was only little difference between the performance of trying to detect emotions conveyed by someone speaking the same language or the other language, and this held true for Japanese as well as for American subjects ; 2) subjects were far from perfect recognisers in the absolute: the best recognition score was 60 percent. (This result could be partly explained by the fact that subjects were asked to utter nonsense utterances, which is quite unnatural, but is confirmed by studies asking people utter semantically neutral but meaningful sentences (cf. Burkhardt F., Sendlmeier W., (2000) "Verification of acoustical correlates of emotional speech using formant-synthesis", in Proceedings of the ISCA Workshop in Speech and Emotion.).

The first result indicates that the goal of making a machine express affect both with meaningless speech and in a way recognisable by people from different cultures with the accuracy of a human speaker is attainable in theory. The second result shows that we should not expect a perfect result, and compare the machine's performance in relation to human performance. The fact that humans are not so good is mainly explained by the fact that several emotional states have very similar physiological correlates and thus acoustic correlates. In actual situations, we solve the ambiguities by using the context and/or other modalities. Indeed, some experiments have shown that the multi-modal nature of the expression of affect can lead to a MacGurk effect for emotions (cf. Massaro D., (2000) "Multimodal emotion perception: analogous to speech processes", ISCA Workshop on Speech and Emotion, Belfast 2000.) and that different contexts may lead people to interpret the same intonation as expressing different emotions for each context (cf. Cauldwell R. (2000) "Where did the anger go? The role of context in interpreting emotions in speech", ISCA Workshop on Speech and Emotion.). These findings indicate that there is no need to have a machine generate utterances that make fine distinctions; only the most basic affects need be investigated.

A number of experiments using computer-based techniques of sound manipulation have been conducted to explore which particular aspects of speech reflect emotions with the most saliency (cf. Murray E. and Arnott J. L. (1993) "Towards a simulation of emotion in synthetic speech", Speech Communication, 16(4), pp. 1097-1108; Banse R. and Sherer K. R. (1996) "Acoustic profiles in vocal emotion expression", Journal of Personality and Social Psychology, 70(3): 614-636; Burckhardt and Sendlmeier (2000) "Verification of acoustical correlates of emotional speech using Formant-synthesis", Proceedings of the ISCA Workshop in Speech and Emotion; and Williams U. and Stevens K. N. (1972) "Emotions in speech: some acoustical correlates", JASA 52, 1228-1250. All these studies basically agree on the conclusion that the most crucial aspects are those related to prosody: pitch (on f0) and contour, the intensity contour and the timing of utterances. Some more recent studies have shown that voice quality (cf. Gobl C. and Chasaide A. N. (2000) "Testing affective correlates of voice quality through analysis and resynthesis", Proceedings of the ISCA Workshop on Emotion and Speech) and certain co-articulatory phenomena (cf. Kienast M. and Sendlmeier W. (2000) "Acoustical analysis of spectral and temporal changes in emotional speech", Proceedings of the ISCA Workshop on Emotion and Speech) are also reasonably correlated with certain emotions.

Regarding of detection of human emotions, whereas humans generally do that by using all the context and modalities, ranging from linguistic content to facial expression and intonation, such a complete approach is unfortunately not realistic for a machine in an uncontrolled environment: for instance robust speech recognition in such situations is out of reach for present day systems, and facial expression recognition needs both computational resources and video devices that robotic creatures most often do not have.

For this reason, the Applicant investigated how emotion detection could be achieved by using only the prosodic information of the voice. Furthermore, the speech of interest is of the kind that occurs in everyday conversations, which means short informal utterances, as opposed to the speech produced when one is asked to read emotionally a prepared text, e.g. paragraph from a newspaper. Four broad classes of emotional content were studied: joy/pleasure, sorrow/sadness/grief, anger and calm/neutral.

As opposed to the automatic recognition of emotions with facial expression (cf. Samal A. and Iyengar P. "Automatic recognition and analysis of human faces and facial expression: a survey" Pattern Recognition, 25(1): 65-77), research using the speech modality is still very young (cf. Bosh L. T. (2000) "Emotions: what is possible in the ASR framework?" (Proceedings of the ISCA Workshop on Speech and Emotion, Belfast 2000). The first studies that were conducted (e.g. Murray and Arnott (1993) "Towards a simulation of emotion in synthetic speech: a review on the literature of human vocal emotion, JASA 93(2), pp. 1097-1108, 1993; Williams U., Stevens K. N., (1972), Emotions and speech: some acoustical correlates, JASA 52, 1238-1250) were not so much attempting to produce an efficient machine recognition device, but rather were searching for general qualitative acoustic correlates of emotion in speech (for example: happiness tends to make the mean pitch of utterances higher than in calm sentences). More recently, the increasing awareness of the fact that affective computing had an important industrial potential (Picard, 1997) pushed research towards the quest for performance in automatic recognition of emotions in speech (Bosh, 2000).

However, no large-scale study using the modem tools developed in the data mining and machine learning community have been conducted. Indeed, most often, either only one or two learning schemes are tested (for e.g. Polzin T., Waibel A. (2000) "Emotion-sensitive Human-computer Interface", in Proceedings of the ISCA Workshop on Speech and Emotion; Slaney M., McRoberts G. (1998) "Baby Ears: a recognition system for affective vocalization, in Proceedings of ICASSP 1998), or very few and simple features are used (Polzin and Waibel 2000, Slaney and McRoberts 1998, Breazal 2000, Whiteside 1997), or only small databases are used—less than 100 examples per speaker (cf. C. Breazeal; L. Aryananda (2000) "Recognition of affective communicative intent in robot-directed speech", in Proceedings of the Humanoids Conference, 2000; McGilloway S. et al. (2000) "Approaching automatic recognition of emotion from voice: a rough benchmark", in Proceedings of the ISCA Workshop on Speech and Emotion; Slaney M., McRoberts G. (1998) "Baby ears: a recognition system for affective vocalisation", in Proceedings of ICASSP 1998) which suggests that the power of some statistical learning schemes may have been overlooked.

Only McGilloway and al. 2000 cited supra have attempted to make some systematic data mining, using more than the traditional/standard set of features used by the rest of the literature: mean, max, min, max-min, variance of the pitch and intensity distributions, and of the lengths of phonemic or syllabic segments, or of pitch rising segments.

However, this work lacks an exhaustive experimental basis: 1) only three kinds of learning schemes were used—support vector machines, Gaussian mixtures and linear discriminants—which are far from being the best at dealing with data in which there are possibly many irrelevant features, and in particular which do not allow to derive automatically smaller set of features with optimal efficiency; and 2) the feature set was explored by choosing one learning scheme and iteratively removing less useful features for classification: on the one hand this is rather ad hoc since it is linked to a very particular learning scheme and selection procedure, and on the other it does not allow to detect the appropriateness of groups of features. Their work is based on speech generated by asking human subjects to read in an emotional manner newspaper texts, which does not correspond to constraints addressed by the present invention.

To this date, the only two research groups have apparently attempted to build automatic recognition machines of everyday speech are (Breazal 2000 and Slaney et al. 1998 cited supra). Yet, theses groups could only use very small databases, very few simple features and two different learning algorithms. Finally, a general conclusion of this existing corpus of research is that recognition rates above 60 percent, even with only four basic emotions, seems impossible if there are several speakers to accommodate. The enormous speaker variability has for instance been described (cf. Slaney et al. 1998, cited supra).

It is therefore an object of the invention to propose a voice-based emotion recognition method and device which is affordable in terms of processing workload, so making it practical to implement in small systems such as pet robots, humanoids or the like, while offering a good success rate at correctly discerning an emotion.

Another object of the invention is to make it possible identify emotions conveyed in short utterances.

A further objet of the invention is to allow operation in real life situations, where utterances are made in noisy and/or acoustically poor environments.

More particularly, the invention proposes, according to first aspect, a method of detecting an emotion conveyed in a voice signal, comprising the steps of:
 extracting a set comprising at least one feature derived from said signal, and
 processing said set of extracted feature(s) to detect an emotion therefrom,
 characterised in that it comprises a step of low-pass filtering the voice signal prior to extracting therefrom at least one feature of that set.

The low-pass filtering step preferably comprises filtering the intensity of the voice signal with a cut-off frequency (Fco) substantially in the range of 150 to 400 Hz, more preferably substantially in the range of 250 to 300 Hz, a preferred cut-off frequency (Fco) being substantially equal to 250 Hz.

Advantageously, the feature extracting step comprises the steps of selectively extracting one or more among 160 features obtained from the following combination of parameters I, II, and II:
 Parameters I:
  i) the intensity of the signal derived after the low-pass filtering step,
  ii) the intensity of the signal without low-pass filtering,
  iii) the pitch of the signal without low-pass filtering, and
  iv) the pitch of the signal derived after the low-pass filtering step;
 Parameters II, from a sequence of values of a parameter I obtained over a duration of the voice signal:
  1) a series of local minimas, whose members are values in the sequence that correspond to a minima,
  2) a series of local maximas, whose members are values in the sequence that correspond to a maxima,
  3) a series of durations (time intervals), whose members are time values separating local (adjacent) extremas, and
  4) a series, whose members are all the successive sampled values of the sequence; and
 Parameters III, calculated from a series of parameter II:
  1) the mean,
  2) the maximum (i.e. the overall highest value),
  3) the minimum (i.e. the overall lowest vale),
  4) the difference between the maximum and the minimum,
  5) the variance,
  6) the median,
  7) the first quartile,
  8) the third quartile,
  9) the interquartile range, defined as the difference between the third and first quartiles,
  10) the mean of the absolute value of the local derivative;
 at least one of the features originating from: i) the intensity of the signal after the low-pass filtering step or from iv) the pitch of the signal after the low-pass filtering step of parameters I.

Preferably, the parameters I comprise more particularly:
 i) the intensity of the signal derived after the low-pass filtering step,
 ii) the intensity of the signal without low-pass filtering, and
 iii) the pitch of the signal without low-pass filtering,
 whereby the combination yields a total of 120 different possible features;
 at least one of the features originating from: i) the intensity of the signal after the low-pass filtering step of parameters I.

Preferably, the parameters III comprise more particularly the following five parameters:
 2) the maximum (i.e. the overall highest value),
 3) the minimum (i.e. the overall lowest vale),
 6) the median,
 7) the first quartile,
 8) the third quartile, Advantageously the extracting step comprises extracting at least one of the following possible features:
 the maximum (i.e. the overall highest value),
 the minimum (i.e. the overall lowest vale),
 the median,
 the first quartile,
 the third quartile,
 calculated from:
 the series of values of the intensity signal derived after the low-pass filtering of the voice signal,
 the series of minimum values of the intensity signal derived without low-pass filtering the voice signal,
 the series of pitch values of the signal derived after the low-pass filtering of the voice signal, and
 the series of pitch values of the signal derived without low-pass filtering of the voice signal.

The extracting step can comprise extracting features derived from both the voice signal after the low low-pass filtering step and from the voice signal without low-pass filtering.

It may also comprises extracting features only from the voice signal after the low-pass filtering step.

Advantageously, the at least one member of the set of features comprises:
 1: the median value of the signal intensity values derived after low-pass filtering the voice signal,
 2: the mean value of the signal intensity values derived after low-pass filtering the voice signal,
 3: third quartile value of the signal intensity values derived after low-pass filtering the voice signal,
 4: the first quartile value of the signal intensity values derived after low-pass filtering the voice signal,
 5: the maximum of the signal intensity values derived after low-pass filtering the voice signal, and
 6: the maximum value of the series of the signal intensity values derived after low-pass filtering the voice signal.

The method may further comprise a step of smoothing a signal extracted from the voice signal prior to the extracting step.

In an embodiment, the method further comprises a step of generating an emotion detecting algorithm using a teaching algorithm, the teaching algorithm exploiting the at least one feature extracted from a low-pass filtered voice signal.

The method may further comprise a step of programming an emotion detection device with an off-line emotion detection algorithm and/or an on-line emotion detection algorithm, whereby the algorithms exploit at least on feature extracted from a low-pass filtered voice signal.

According to a second aspect, the invention concerns a device for detecting an emotion conveyed in a voice signal, comprising the:

extracting means for extracting a set comprising at least one feature derived from the signal, and processing means for processing the set of extracted feature(s) to detect an emotion therefrom, characterised in that it comprises a low-pass filtering means for low-pass filtering the voice signal prior to extracting therefrom at least one the feature of the set.

The optional features presented above in the context of the method apply mutatis mutandis to the above device, and shall not be repeated for conciseness.

According to a third aspect, the invention relates to a voice signal processing device specifically for the device according to the second aspect—or specifically adapted for the implementation of the method according to the first aspect—, characterised in that comprises low-pass filtering means for supplying a low-passed form of the voice signal to the extracting means.

The invention and its advantages shall become more apparent from reading the following description of the preferred embodiments, given purely by way non-limiting examples with reference to the appended drawings in which.

The preferred embodiment of the invention is chosen to be speaker dependant for the emotion recognition process. This is not necessarily a bad point from an industrial point of view, when the embodiment it is targeted at robotic pets, for instance, which may interact only with their minder. Also, the fact that robots only manage to recognise their minder could even be a positive feature, because it is a source of complicity between a robot and its minder). However, the principles of invention can of course accommodate for speaker-independent approaches, as shall be outlined further.

The embodiment is based on a robotic pet application, with four basic emotional states to detect in a human voice: i) calm, ii) sad, iii) angry and iv) happy.

Figure 1:
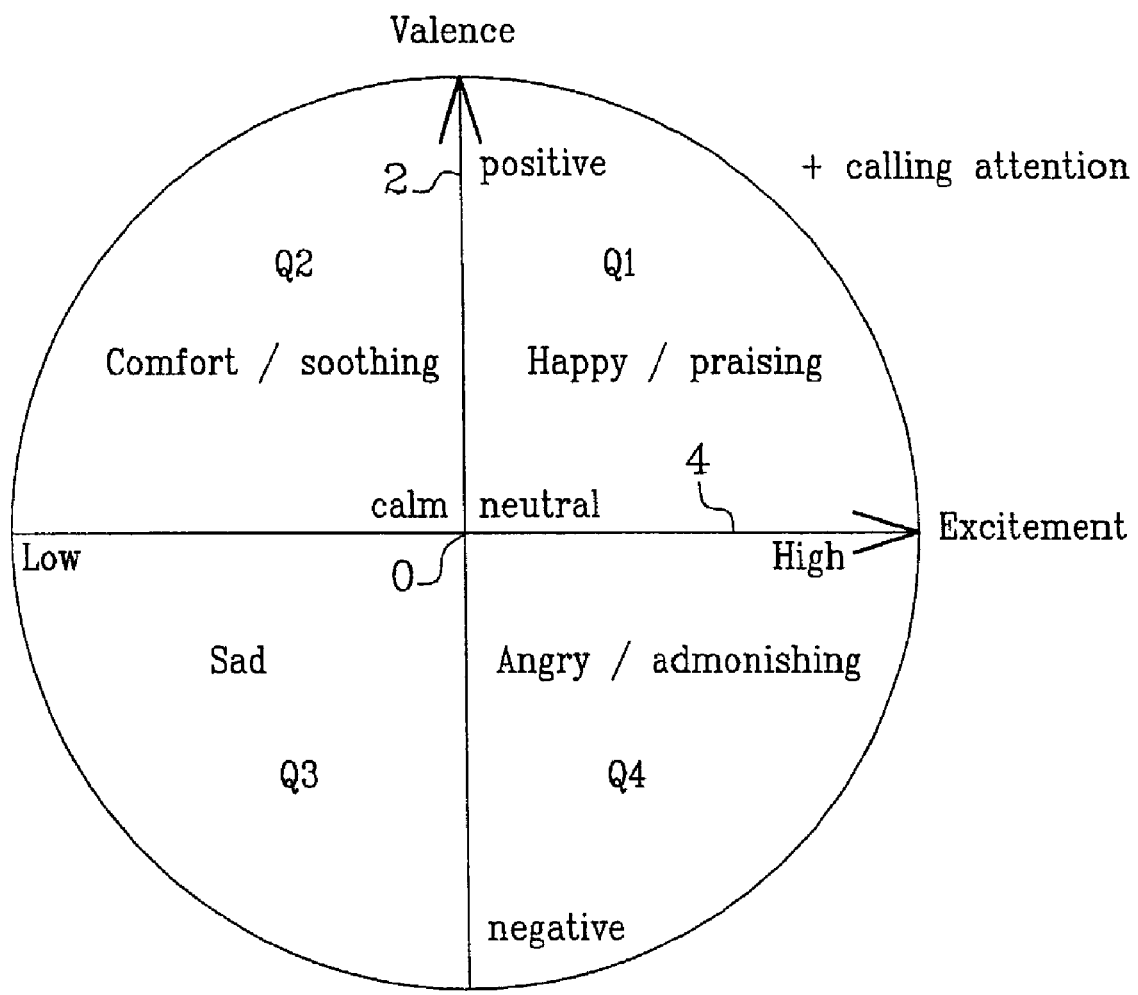
FIG. 1 is a chart showing how some basic emotions are linked to such parameters as valence and excitement.

FIG. 1 shows how these emotions are positioned in a chart which represents an "emotional space", in which the parameters "valence" and "excitement" are expressed respectively along vertical and horizontal axes 2 and 4. The valence axis ranges from negative to positive values, while the excitement axis ranges from low to high values. The cross-point O of these axes is at the centre of the chart and corresponds to a calm/neutral state. From that point are defined four quadrants, each containing an emotional state, as follows: happy/praising (quadrant Q1) characterised by positive valence and high excitement, comfort/soothing (quadrant Q2) characterised by positive valence and low excitement, sad (quadrant Q3) characterised by negative valence and low excitement, and angry/admonishing (quadrant Q4) characterised by negative valence and high excitement.

The constraints imposed on the embodiment were as follows:

persons may talk very freely to the robotic pet, persons may utter very short sentences, such as "Aibo! you're a really naughty robot!", the utterances will have to be detected in a noisy environment, and several persons may have to interact with the robot, whereupon a choice of speaker dependency or independence needs to be made.

Some of these constraints implied that the utterances be restricted to infant-directed type of speech.

At an initial stage, a strategy for study was developed to determine how best to meet these objectives. This strategy can be summarised as follows:

i) experiment with simple features, simple algorithms and small databases, ii) explore systematically features and learning algorithms for the speaker-dependent case:

a) with many examples, using a database with samples from two speakers, one male, the other female, b) with only a few examples of the above two-speaker database, and iii) conduct experiments in real-life situations with fluent speech.

Database for Study

The study was conducted using very large database of two speakers containing informal short emotional utterances. All experiments were conducted using the freely available data mining software Weka which implements most of the standards data mining techniques, information on which can be found in the Weka web page at: http://www.cs.waikato.ac.nz/~ml/.

In order to have sufficiently large databases, some compromises had to made (the recording conditions as described in Slaney et al, 1998 or Breazal 2000 are rather poor and unpractical). Accordingly, the database used for the experimental study used two Japanese professional speakers (respectively male and female), who are both voice actor/actress and worked on many radio/TV commercials, Japanese dubbing of movies and animations. They were asked to imitate everyday speech by pronouncing short sentences or phrases like "Umm, I don't know", "Exactly!", "See", "Hello", "I see", "How are you?", "What kind of food do you like?", "Wonderful!", "D'you know". Before each utterance, they had to imagine themselves in a situation where they could produce the phrase, and which would correspond to one of the four emotional classes: joy/pleasure, sorrow/sadness/grief, anger, normal/neutral. If several emotions were compatible with the sentence meaning, then they were allowed to utter each phrase with the corresponding emotion. The resulting database comprised 200 examples per speaker and per emotion, making a total of 2000 samples.

The database stored in digital form the sound recordings of the samples, so that each sample could be accessed and played back at will.

The two main measurements that were undertaken concerning intonation were pitch and intensity, as in all the reported works reported mentioned supra.

Figure 2:
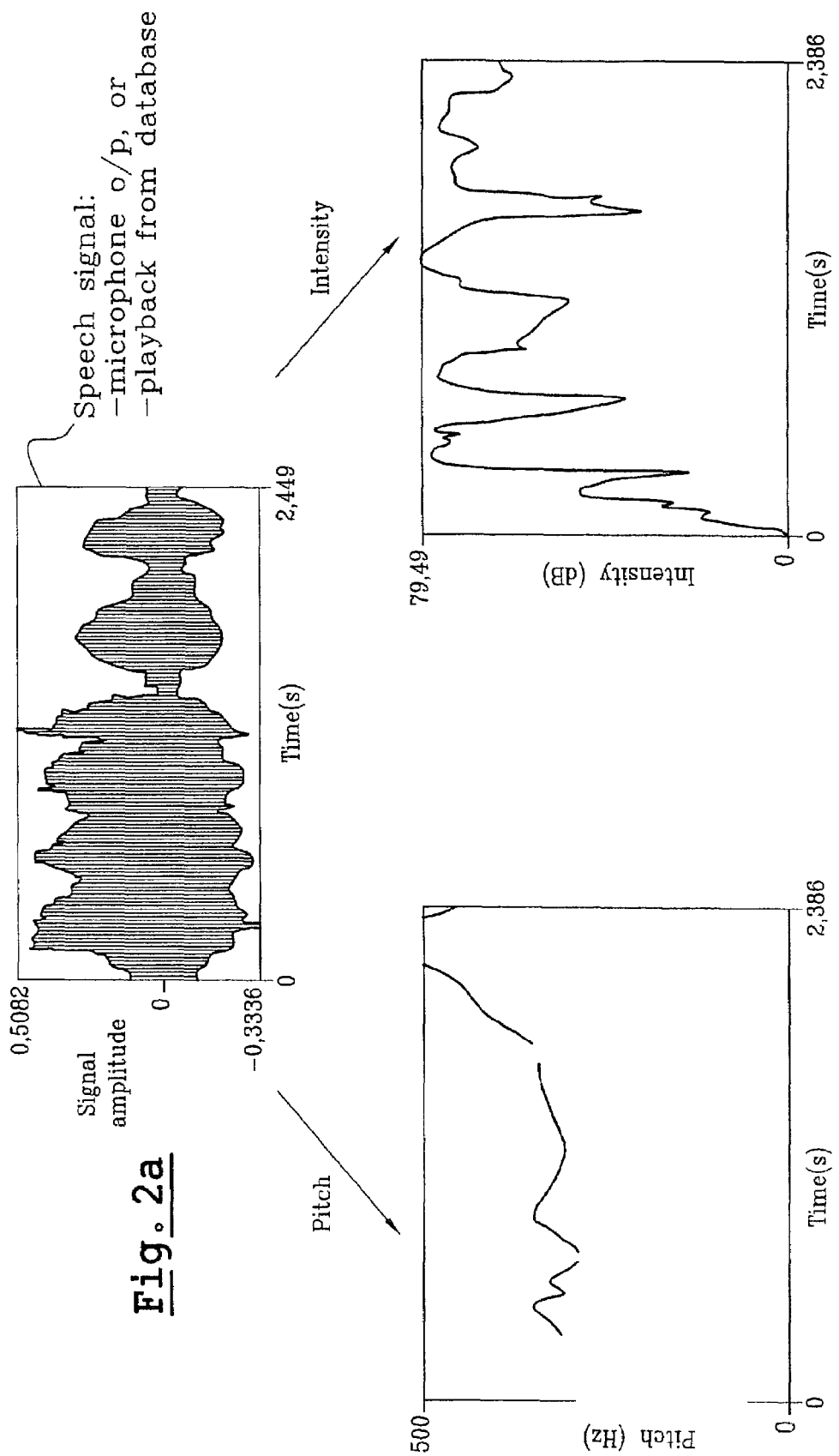
FIGS. 2a, 2b and 2c are signal waveforms showing the relation between a speech signal (FIG. 2a), pitch (FIG. 2b) and intensity (FIG. 2c)

FIGS. 2a-2c illustrate how the two physical parameters pitch and intensity are derived from a speech signal. The latter is illustrated in FIG. 2a as a waveform envelope, as obtained e.g. directly from a microphone output or from playing back a voice sample. The waveform is the fluctuation in signal amplitude (vertical axis) as a function of time (horizontal axis). In the representation, the signal strength is assigned a zero value at a median position, from which it can take on negative (low amplitude) and positive (high amplitude) values.

Pitch is a subjective quality of a sound that determines its position in a musical scale or voice spectrum. It may be measured as the frequency of the pure tone of specified intensity that is judged by the average ear to occupy the same place in the musical scale or voice spectrum. FIG. 2b illustrates a variation of pitch with time. Here, pitch is measured in terms of a frequency (vertical axis) for a particular time value.

Intensity is a measure the sound energy integrated over a given frequency spectrum. FIG. 2c illustrates the variation of intensity with time, with the intensity measured in terms of decibels (dB).

Additionally, in accordance with a feature specific to the present invention, measurements were made on a low-pass filtered form the electronic signal conveying the utterances, hereafter referred to as the voice signal.

Figure 3:
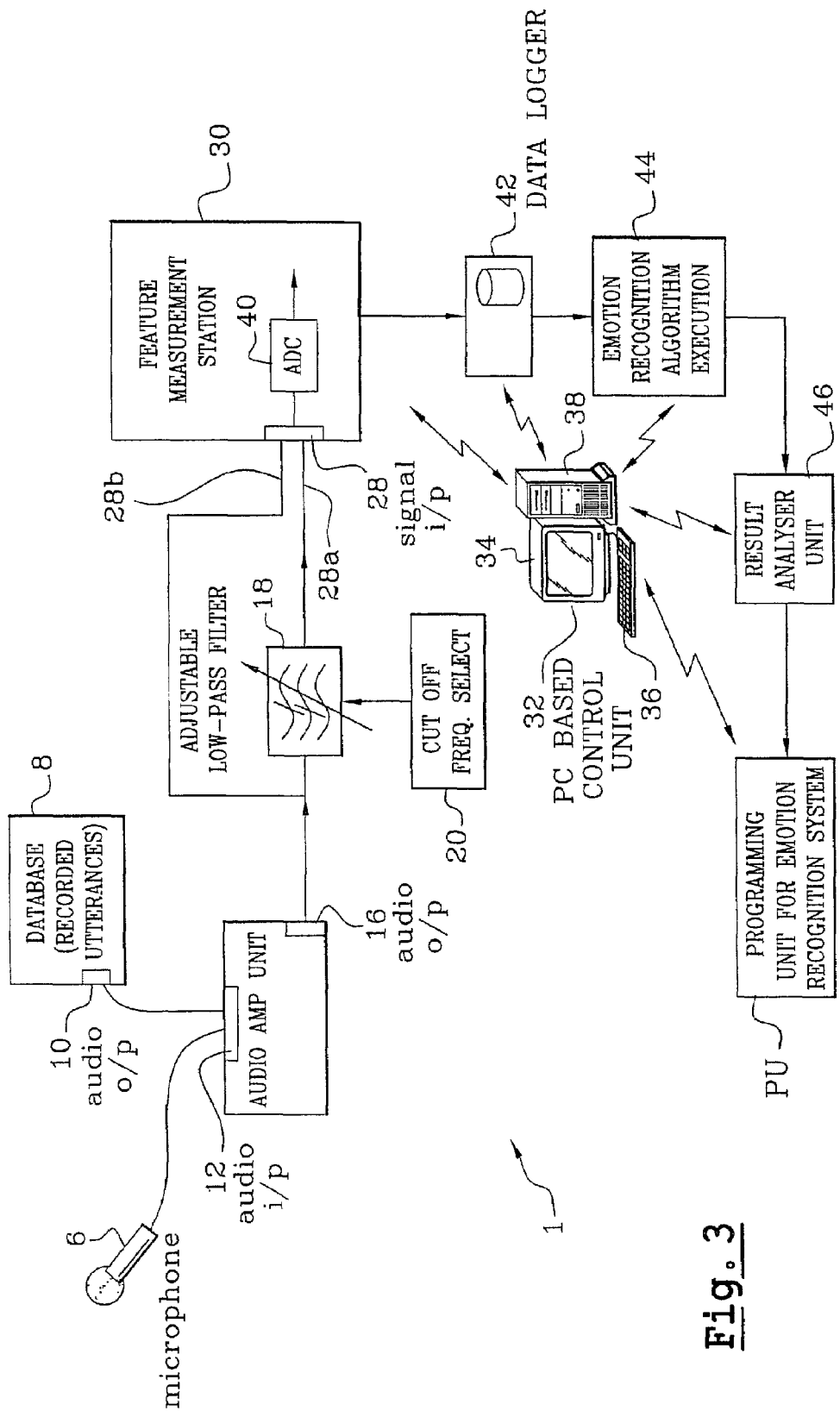
FIG. 3 is a block diagram of a system for evaluating, characterising and optimising an emotion detection approach using low-pass filtering of the audio signal on which an emotion is to be detected, in accordance with the invention.

FIG. 3 illustrates schematically a system 1 for evaluating emotion detection performance with the possibility of low-pass filtering the voice signal.

The voice signal can be obtained either directly from a microphone 6 or from the above-mentioned database of recorded utterances 8. In the latter case, each of the samples can be selectively read out in audio format, e.g. from a hard disk drive, so as to obtain an audio signal of the corresponding utterance at an audio output 10. The signal from the microphone 6 or database audio output 10 is fed to an audio input 12 of an audio amplification unit 14 which provides impedance matching, preamplification, and controllable gain functions. The thus-prepared audio signal is delivered at an audio output 14, from which it is fed to a low-pass filter 18. In the system 1, the low-pass filter 18 has an adjustable cut-off frequency Fco, the value of which is selected by a cut-off frequency selection unit 20.

Figure 4:
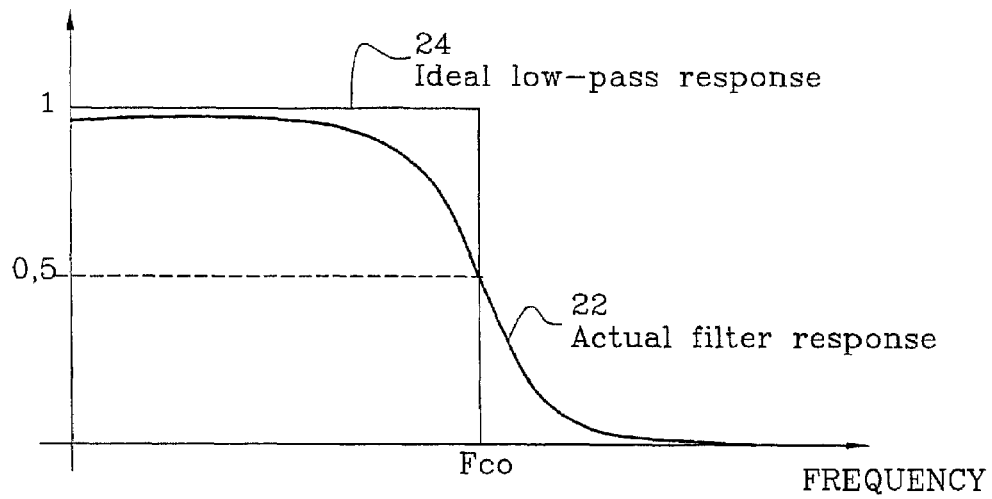
FIG. 4 is a curve showing a typical and an ideal low pass filter response curve.

FIG. 4 shows a typical frequency response of the low-pass filter 18 with a curve 22 showing the variation of transferred audio signal level against frequency for an input of constant amplitude over the frequency range. The cut-off frequency Fco is shown as the point of half attenuation along the frequency scale. Ideally, the cut-off frequency is the frequency value beyond which the low-pass filter does not transfer a signal. The sharpness depends on the filter characteristics, e.g. the order of filtering, to approach the ideal low-pass response 24.

Figure 5:
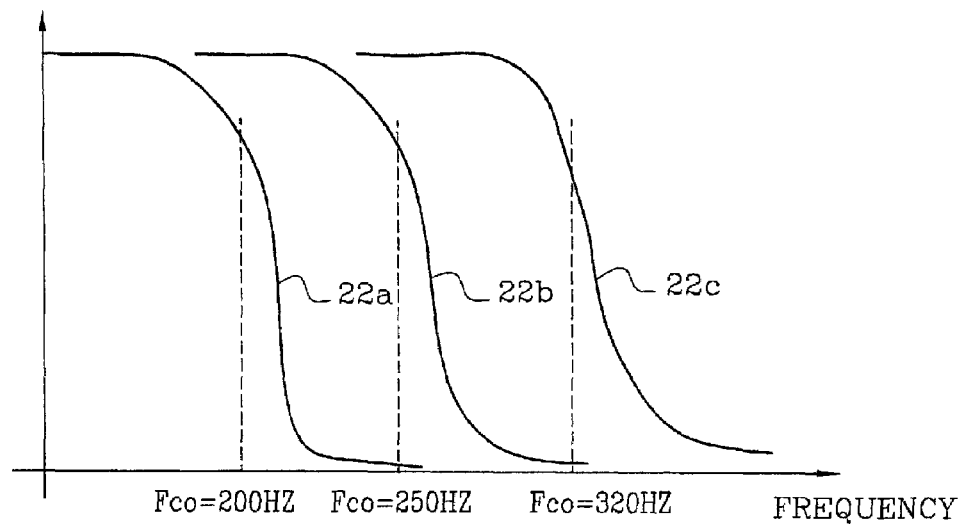
FIG. 5 is a set of curves showing the response of an adjustable cut-off frequency filter used in the system of FIG. 3.

FIG. 5 shows how the frequency response changes according to the cut-off frequency Fco selected through the selection unit 20, with three curves illustrated 22a, 22b and 22c corresponding to Fco values respectively of 200 Hz, 250 Hz and 320 Hz. The shape of the response curves are substantially the same. In the system of FIG. 3, the low-pass filter has a continually adjustable cut-off frequency Fco in view of obtaining fine level comparisons. The cut-off frequency selection unit 20 can be electronically controlled to vary a filter component, such as one or several varicap diodes.

The filter 18 is constructed as an analog circuit based on operational amplifiers. Such adjustable cut-off frequency low-pass filters are well known in the art and shall not be described here for conciseness. It can of course equally well be envisaged to produce the low-pass filtering function entirely by digital filtering techniques using e.g. digital signal processors, which are also well known in the art. In this case, the input audio signal would be initially digitised for processing by the filter electronics, the latter reproducing the response curve 22 in a suitably digitally encoded form.

The output from the low-pass filter 18 is then supplied to a first input 28a of an audio interface 28 of a feature measurement station 30, which is represented as a functional unit cooperating with a PC based control unit 32.

There is also a separate leading from the audio output 16 directly to a second input 28b of the audio interface 28 of the feature measurement station 30. The two inputs 28a and 28b constitute separate input channels allowing the feature measurement station 30 to operate selectively on the low-pass filtered form and non filtered forms of the audio signal.

The PC based control unit 32 is composed of a monitor 34 and keyboard 36 forming the system interface, and a complete PC type computer 38 for the processing, drive and data storage functions. The feature measurement station 30 is programmable to extract different features of the signal presented at its signal input 28. As feature extraction provided by the station 30 is based on digital processing techniques, its signal input 28 is connected to an internal analog-to-digital converter (ADC) 40. The filtered audio signal is then processed in terms of binary words to extract the required features, which are discussed below.

The measurements on the different features produced by the station 30 are stored in a data logger 42 where they can be accessed by a functional unit 44 which performs emotion recognition algorithms. The algorithms aim to discern an emotion expressed in the voice signal on the basis of the signal features extracted by the station 30. Typically, an algorithm under evaluation in unit 44 will indicate the discerned emotion (calm, happy, . . . ) and various internal parameters. The recognition unit 44 can thus execute different emotion recognition algorithms and produce their respective results and internal parameters.

This information is entered into a results analyser unit 46 where different algorithms and/or choices of features can be compared in view of determining an optimum selection.

It will be appreciated the functional units composed of the feature measurement station 30, data logger 42, emotion recognition algorithm execution unit 44 and the results analyser 46 can be implemented physically by the PC based control unit 32, as indicated by the staggered double-arrows.

The system further includes a programming unit PU whose function is to program different emotion recognition systems on the basis of the most appropriate results found. To this end, the programming unit PU is operationally connected to the results analyser 46 as well as to the PC based control unit 32 and other units, so as to record all the algorithms, parameter settings, features to extract and other optimisations. The recording of this information is established in accordance with a predetermined protocol so that the programming data can be downloaded into a suitable programming interface of the an emotion sensitive system, such a robotic pet or the like. The programming unit PU can be made detachable from the rest of the system and portable for on-field programming, and/or adapted to produce the programming data on a portable recording medium, such as a disk, semiconductor memory, or the like.

The measurements performed by the feature measurement station 30 were based on the intensity of low-passed form of the voice signal, as obtained from the filter 18. (Separate experiments were also conducted on high-passed forms using a high-pass filter instead.)

For the low-pass filtering, the cut-off frequency was typically set to 250 Hz (the particular value appears not to be crucial), the idea being to separate the signal into a pure prosodic component and a pure "ceptral" component.

The samples from the database 8 thus provide sound patterns on which various measurements can be made at the station 30. Psycho-acoustic measurements have shown that the most important information is prosody (intonation), and in particular the pitch curve (f0) (cf. FIG. 2b) and the intensity (I0) curve (cf. FIG. 2c).

In the evaluation, three different signals were processed by the station 30:

i) the intensity of the signal after low-pass filtering, ii) the intensity of the signal without low-pass filtering, and iii) the pitch of the signal without low-pass filtering.

The first signal i) is taken from input 28a, while the last two signal is taken from input 28b of the feature measurement station 30.

Note that the pitch can also be measured on the signal after low-pass filtering either instead of on the non filtered signal iii), or in addition, in which case the number of signals in the evaluation total four. However, experiments have shown that the information provided by the pitch analysed from the low-pass filtered signal is generally not significantly different from that provided by the pitch of the unfiltered signal. Accordingly, only signals i) to iii) are actually used in the evaluation.

After low pass filtering, the intensity curve of the resultant signal i) was measured in the same way as for the unfiltered signal.

Finally, to be exhaustive, there was conducted a ceptral measurement on signals iv) computed from the norm of the absolute vector derivative of the first 10 MFCCs (mel-frequency ceptral components). In speech recognition, there is often performed a measurement at each time step of the ceptral content, which is a parameter equivalent to the excitation of different nerves in the cochlea. These can correspond to the different ceptral coefficients of the signal. The measurement establishes the mean of the local slope of the derivatives of the vectors in the cepters. Typically, these measurements yield ten coefficients with ten values that evolve in time, and establish the difference between the successive vectors, from which can be obtained the norm of the vectors.

All these measurements i) to iv) above were performed at each 0.01s time frame, using a signal processing toolkit freely available under the name "Praat software", information on which can be found in web page "http://www.praat.org".

In particular, the pitch was computed using the algorithm described in Boersma P. (1993) "Accurate short-term analysis of the fundamental frequency and the harmonics-to-noise ratio of a sampled sound", in Proceedings of the Institute of Phonetic Sciences of the University of Amsterdam, 17, 97-110 1993, which is known to be very accurate.

In what follows, the ceptral measurement signals (iv) are taken into account in the evaluation; only measurements on signals i) to iii) cited above shall be considered.

Each of these measurements provides a series of values that were transformed to produce different points of view on the data.

The procedure to obtain the series of values is as follows. For a given voice sample from the database 8, typically corresponding to a short phrase, the feature measurement station 30 stores the corresponding voice signal produced at the input (channel 28a or 28b depending on the signal i), ii) or iii) above to be analysed). The signals are initially 10 Hz smoothed.

From that stored 10 Hz smoothed signal are computed each of the three time-varying signals i) to iii) mentioned above.

Each thus-computed signal i) to iii) is digitally sampled at e.g. 0.01 second intervals. Each sampling gives an absolute instantaneous value of the intensity (signals i) and ii))) or of the pitch (signal iii)).

For each sampled signal, there is thus obtained a sequence of sampled values, typically a few hundred, given that a phrase is a few seconds long. The sequence of values is stored in time order, starting from the value of the earliest part of the signal, so that the sequence of values expresses the time variation of signal i), ii) or iii) considered.

For each signal, the corresponding time-ordered sequence of values is analysed to produce the following four series of values:

1) The series of local minimas. This involves determining the values in the sequence that correspond to a minima and constructing a series formed just of these minima values of the sequence. The series is stored in time order, starting from the earliest minima. A minima in the sequence of values is identified as a member of the sequence whose value is less than that of its neighbour immediately before and immediately after in the sequence.

2) The series of local maximas. This involves determining the values in the sequence that correspond to a maxima and constructing a series formed just of these maxima values of the sequence. The series is stored in time order, starting from the earliest maxima. A maxima in the sequence of values is identified as a member of the sequence whose value is greater than that of its neighbour immediately before and immediately after in the sequence.

3) The series of durations (time intervals) between local (adjacent) extremas (which models rhythmic aspects of the signal). An extrema is either a minima or a maxima. This involves first identifying in the sequence the values that correspond to a minima or a maxima, by comparing each value with its immediately adjacent neighbours as for series 1) and 2) above. Then, the positions in time of the identified extremas are analysed to determine the time intervals separating successive extrema. These time intervals are set out in a series, starting from the interval separating the earliest and next earliest extremas, to yield the series of time intervals.

4) The series itself. This simply involves forming a series from all the successive sampled values of the sequence, starting from the beginning of the sampled voice signal.

Figure 6:
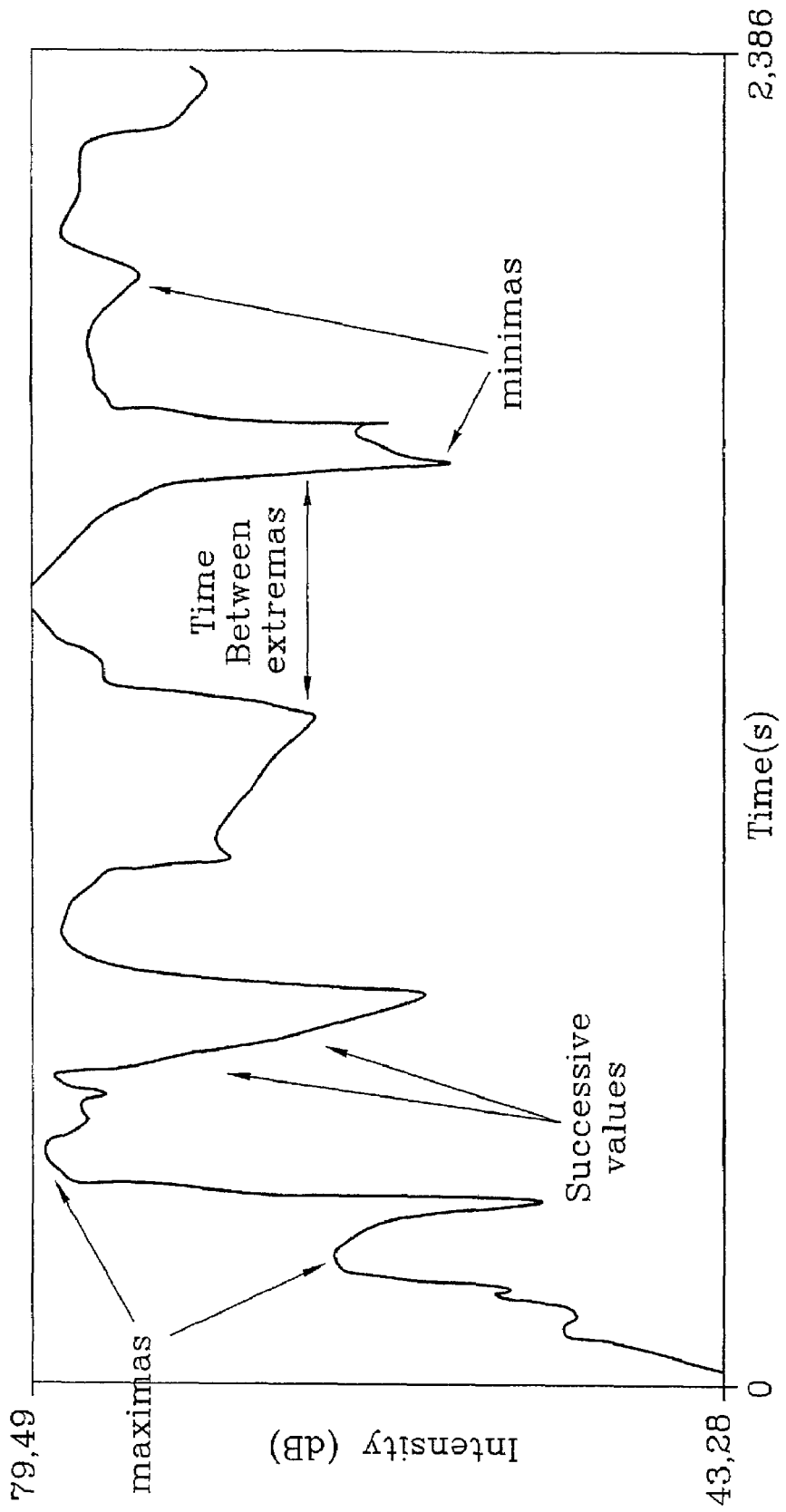
FIG. 6 is a sample signal waveform (signal intensity vs. time) showing how different signal features considered are derived.

FIG. 6 illustrates how these four series of values are obtained from the signal undergoing measurement.

It will be noted that for each signal i) to iii) above measured, the four series of values 1) to 4) above are extracted, giving a total of 12 series of values per audio sample of the database.

Finally, the following ten statistical characteristics are computed for each of the twelve series of values:

1) the mean, 2) the maximum (i.e. the overall highest value), 3) the minimum (i.e. the overall lowest vale), 4) the difference between the maximum and the minimum, 5) the variance, 6) the median,
7) the first quartile,
8) the third quartile,
9) the interquartile range, defined as the difference between the third and first quartiles,
10) the mean of the absolute value of the local derivative.

All the data are initially normalised before calculating these statistical characteristics.

The resulting combination of these ten characteristics applied to the four series gives rise to 3*4*10=120 features.

Learning Algorithms

Next, after all these values are obtained for each signal, an experiment was conducted using different automated learning methods. The latter are capable of learning and generalising from a certain number of examples. Many such methods are known, each having their advantages and disadvantages. The approach makes a fairly exhaustive use of these different algorithms.

For each learning algorithm tested, there is input a base set of examples. The performance for each base set is then checked against another example base set. This allows to determine a percentage of correct generalisations made by each learning algorithm.

There are many learning schemes that have been developed in the last 20 years (e.g. Witten I., Frank E. (2000) "Data Mining", Morgan Kaufflan Publishers.), and they are often not equivalent: some are more efficient with certain types of class distributions than others, while some are better at dealing with many irrelevant features (which is the case here, as seen a posteriori) or with structured feature sets (in which this is the "syntactic" combination of the values of features which is crucial). As, by definition, the structure of the data and/or the (ir-)relevance of its features is unknown, it would be a mistake to investigate the problem with only very few learning schemes. As a consequence, it was chosen to use a set of the most representative learning schemes, ranging from neural networks to rule induction or classification by regression. Also, one of the best meta-learning scheme, was used, namely AdaBoostM1 (Witten and Frank, 2000 cited supra), which significantly improves the generalisation performance for unstable learning schemes like decision trees (an unstable learning algorithm is one that can sometimes produce very different recognition machines when only a slight change in the learning database has been performed). One reason for choosing the Weka software was that its code and executable are freely available, so that the experiment, though being large scale, can be easily reproduced. This software also provides means like automatic cross-validation, or the search of feature spaces with for e.g. genetic algorithms as shall appear later. The list of all learning algorithms is given in table I below.

TABLE I list of learning algorithms investigated

| Name | Description |
| --- | --- |
| 1-NN | 1 nearest neighbour |
| 3-NN | voted two nearest neighbours |
| 10-NN | voted ten nearest neighbours |
| Decision tree/C4.5 | C4.5 decision trees |
| Decision Rules/PART | PART decision rules |
| Kernel Density | Radial basis function - neural network |
| KStan | — |
| Linear Regression | Classification via linear regression |
| LWR | Classification via locally weighted regression |
| Voted Perceptrons | Committee of perceptrons |
| SVM1 | polynomial (deg. 1) support vector machine |

TABLE I-continued list of learning algorithms investigated

| Name | Description |
| --- | --- |
| SVM2 | polynomial (deg. 2) support vector machine |
| SVM3 | polynomial (deg. 3) support vector machine |
| VFI | Voted features interval |
| M5Prime | Classification via M5Prim regression method |
| Naive Bayes | Naive Bayes classification algorithm |
| AidaBoost M1/C4.5 | Ada boosted version of C4.5 |
| AidaBoost M1/PART | Ada boosted version of PART |

More details about these algorithms can be found in Witten and Frank, 2000 cited supra.

In a first experiment, an evaluation was conducted in which all algorithms were attributed all the (normalised) features, and were trained on 90 percent of the database and tested on the remaining 10 percent. This was repeated 10 times, with each time a different 90/10 percent split (a 10-fold cross-validation thus being performed).

Table II below gives the average percentage of correct classification for the 10 fold cross-validation for the different algorithms used.

TABLE II results using all features for two different speakers (1 and 2)

| | Emotion detection success rate (%) | |
| --- | --- | --- |
| Algorithm | Speaker 1 | Speaker 2 |
| 1-NN | 82 | 87 |
| 3-NN | 84 | 87 |
| 10-NN | 83 | 87 |
| Decision tree/C4.5 | 84 | 93 |
| Decision Rules/PART | 84 | 94 |
| Kernel Density | 84 | 90 |
| KStan | 81 | 83 |
| Linear Regression | 88 | 91 |
| LWR | 87 | 90 |
| Voted Perceptrons | 70 | 76 |
| SVM1 | 88 | 94 |
| SVM2 | 89 | 94 |
| SVM3 | 88 | 94 |
| VFI | 80 | 93 |
| M5Prime | 86 | 96 |
| Naive Bayes | 84 | 90 |
| AidaBoost M1/C4.5 | 90 | 96 |
| AidaBoost M1/PART | 91 | 97 |

It can be observed from these results that very high success rate (between 92 and 97 percent), which is higher than any other reported result in the literature can be obtained thanks to the use of certain algorithms. However, the difference among algorithms is striking: whereas the best results are obtained with "Adaboosted" decision trees and rules, some others perform 10 percent below (like nearest neighbours, RBF neural nets or Support Vector Machines, which are the ones typically used in other studies), or even 20 percent below (Committees of perceptrons). This illustrates that care must be taken to try many different learning schemes when solving a problem about which there is very little by way of few prior or intuitive knowledge.

Feature Selection

After this first experiment, the next step is to see how the feature set could be reduced, for three reasons:

1) a small features set can be expected to provide better generalisation performance (see Witten and Frank, 2000 cited supra);

2) it is computationally cheaper to compute fewer features;

3) it is interesting to see if the most useful features for the machine learning algorithms are the ones that are traditionally put forward in the psychoacoustic literature.

A first way of exploring the feature set is to look at the results of learning schemes like decision rules (PART), which are often used mainly as knowledge discovery devices.

One specific choice of rules and parameterisation produced and tested by the Applicant is:

EXAMPLE 1

If MEDIANINTENSITYLOW>0.48 and
MINMINIMASPITCH<=0.07 and
THIRDQUARTINTENSITY>0.42==>CALM
ELSE If MEANINTENSITYLOW<=0.58 and
MEDIANINTENSITYLOW<=0.29==>ANGRY
ELSE If THIRDQUARTINTENSITYLOW>0.48==>SAD
ELSE==>HAPPY (the symbol "<=" means "less than or equal to").

All the numerical values are normalised.

The definition of declared variables in the above algorithm are as follows:

MEDIANINTENSITYLOW: the median value of series of values of the intensity of the signal after low-pass filtering;

MINMINIMASPITCH: the value smallest minima in the series of minima in the pitch of the signal without low-pass filtering;

THIRDQUARTINTENSITY: the value of the third quartile in the series of values of the intensity of the signal without low-pass filtering;

MEANINTENSITYLOW: the mean value of the of the series of intensity values of the signal after low-pass filtering;

THIRDQUARTINTENSITYLOW: the value of the third quartile in the series of intensity values of the signal after low-pass filtering.

These four and surprisingly simple rules allow a remarkably high percentage of correct classification in generalisation of 94 percent for the speaker 2 database. The striking fact is the repeated use of features related to the intensity of the low-pass signal.

Different sets rules can be adapted for optimised performance with different speakers/languages. The choice of an appropriate set of rules for a given speaker/language can be determined empirically.

Figure 7:
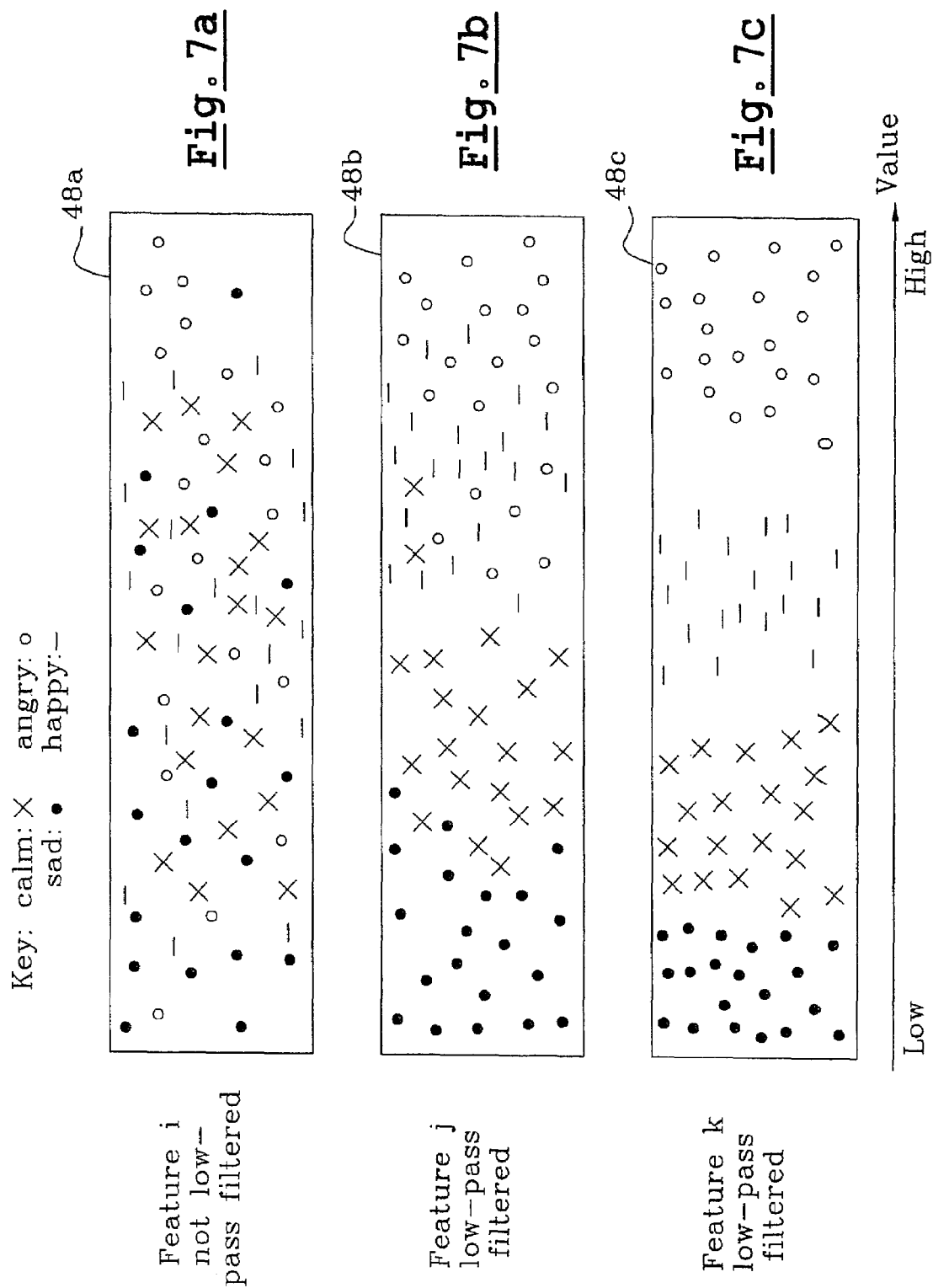
FIGS. 7a, 7b and 7c are plots showing different distributions of voice samples when analysed in terms of different extracted signal features for emotion detection, respectively for a poorly informative, good and even better chosen feature.

Another view of the feature set can be obtained simply by visualisation. An example of such a visualisation is illustrated in FIGS. 7a-7c, which each depict an example of a line of measurements for a feature i, j and k respectively taken among the 160 features investigated, as explained above. For each line is defined a space in a rectangular box 48a-48c within which are plotted a number of points. Each plotted point corresponds to an identification of the voice samples of the database 8. The position of a point corresponds to the associated measurement value for the feature considered (evolving on the horizontal scale). The emotion corresponding to the plotted samples is identified by the following key: dot=calm, cross=sad, dash=angry, circle=happy. In the complete experiment, 160 such lines are produced, one for each feature.

FIG. 7a shows a typical haphazard distribution of identified emotion samples, showing that the feature i from which it is generated does not provide a good basis for discerning emotions. Such a distribution is frequent among features extracted from a voice signal that has not been low-pass filtered.

FIG. 7b shows a significantly more clustered distribution of identified emotion samples, indicating that the feature from which it is generated is potentially good for discerning emotions. However, there is some overlap between neighbouring clusters. Such a distribution is quite typical of a feature extracted from a voice signal whose intensity has been low-passed filtered, the cut-off frequency (f0) being 250 Hz in the examples.

Finally, FIG. 7c shows an even better distribution of identified emotion samples where the emotion samples are not only well clustered, but also clearly separated by empty regions. Such results are obtained with some features extracted from a voice signal whose intensity has been low-pass filtered.

(Note: to avoid cluttering, only a representative fraction of the voice samples are plotted in the figure.)

The impressive results obtained by low-pass filtering the intensity of the voice signal was confirmed with different speakers.

In the experiment, six features were selected among the group, for having the best clustering of emotion samples with at least some empty regions separating them.

Generally, the best results are obtained by considering the following features of the low-passed filtered intensity of the voice signals:

quartiles, notably the first and third quartiles, maximas, minimas, and the mean.

By contrast, the least conclusive results were obtained from features involving the variance or mean of the absolute slope of the low-pass filtered signal.

Figure 8:
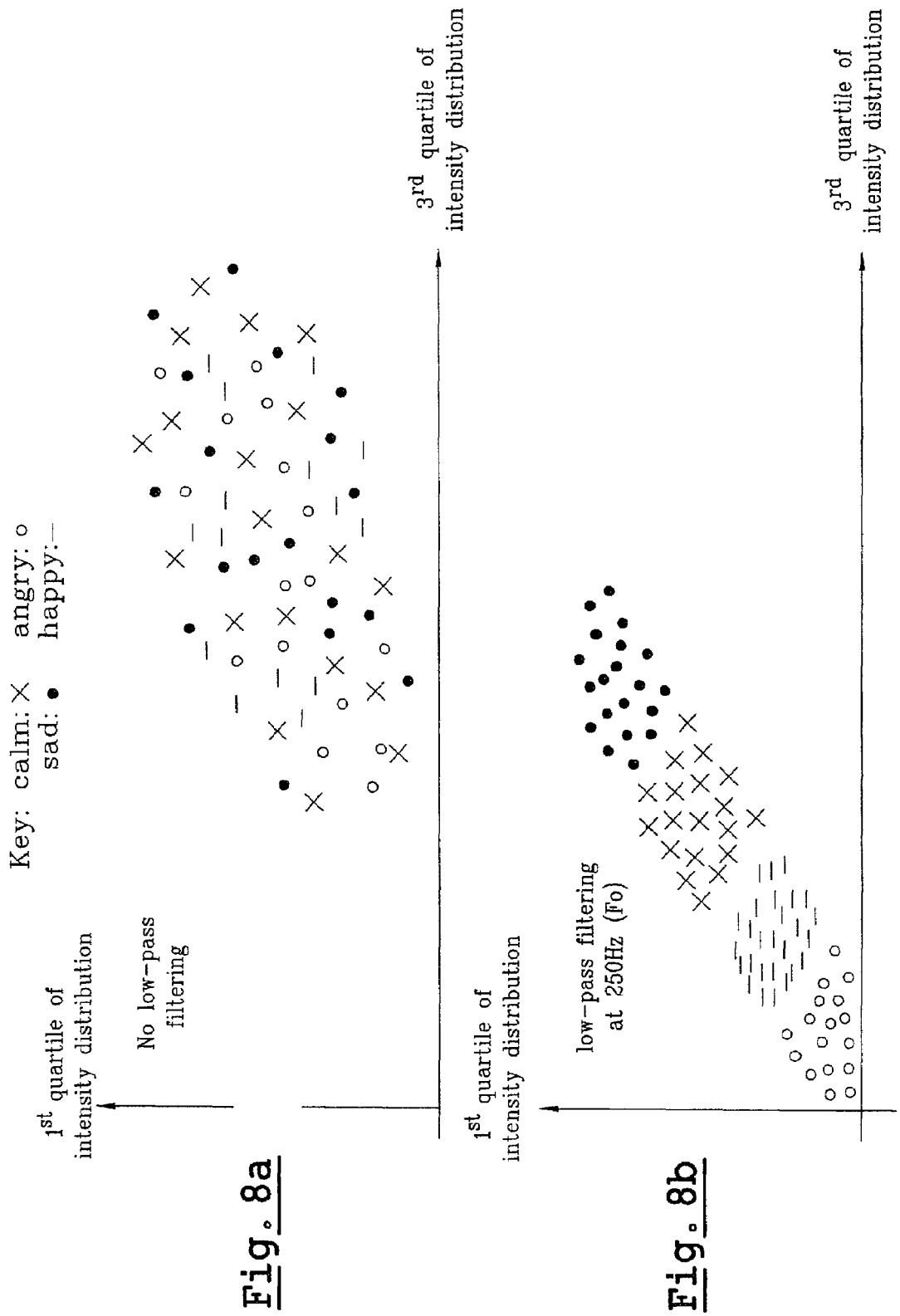
FIGS. 8a and 8b are plots of detected emotion in terms of first and third quartile intensity distribution expressing the degree of success in emotion detection in terms of grouping characteristics of data points, respectively for a detection on an unfiltered signal and for a low-pass filtered signal with a cut-off frequency of 250 Hz.

To confirm the Applicant's intuition that low-passed intensity is crucial in the distinction of emotions, FIGS. 8a and 8b show plots of identified emotions from the samples of the database 8. In theses plots, two features noted for yielding potentially good emotion discernment are expressed on respective orthogonal axes: the first quartile of intensity distribution on the vertical (ordinate) axis, and the third quartile of intensity distribution on the horizontal axis (abscissa). The symbols used to identify the four different emotions are the same as in FIGS. 7a-7c. Similarly, only a representative fraction of symbols are inserted to avoid cluttering.

The plots of FIG. 8a are produced from the voice samples of the database without low-pass filtering, while the plots of FIG. 8b are produced from the same voice samples, but after low-pass filtering with a cut-off frequency of 250 Hz using the filter 18 of FIG. 3. The voice samples in both cases came from the same speaker (speaker 2). The same very striking effect also takes place for speaker 1; but what is interesting is that the clusters are not situated at the same places (anger and happiness are 90 degrees rotated), which is an illustration of the great speaker variability initially suspected. However, it seems that the use of some well chosen features is very stable for each speaker.

In order to quantify the individual relevance of features or attributes, there is a measure that is often used in the data mining literature, which is the expected information gain, or mutual information between class and attribute. It corresponds to the difference between the entropies H(class) and H(class|attribute) (see Witten and Frank, 2000 cited supra, for details about how it is computed). Table III below gives the 20 best attributes according to the information gain they provide.

TABLE III

Information gain of 20 best features

| Feature | Information gain |
|---|---|
| 1: MEDIANINTENSITYLOW<br>(median value of sampled low-pass filtered signal intensity values) | 1.44 |
| 2: MEANINTENSITYLOW<br>(mean value of low-pass filtered signal intensity values) | 1.40 |
| 3: THIRDQUARTINTENSITYLOW<br>(third quartile value of series of sampled low-pass filtered signal intensity values) | 1.35 |
| 4: ONEQUARTINTENSITYLOW<br>(first quartile value of series of sampled low-pass filtered signal intensity values) | 1.34 |
| 5: MAXINTENSITYLOW<br>(maximum value of series of sampled low-pass filtered signal intensity values) | 1.23 |
| 6: MININTENSITYLOW<br>(maximum value of series of sampled low-pass filtered signal intensity values) | 1.14 |
| 7: THIRDQUARTMINIMASPITCH<br>(third quartile value of series of minimas of sampled unfiltered pitch values) | 0.72 |
| 8: THIRQUARTMAXIMASPITCH<br>(third quartile value of series of maximas of sampled unfiltered pitch values) | 0.72 |
| 9: THIRDQUARTPITCH<br>(third quartile of series of sampled unfiltered pitch values) | 0.69 |
| 10: MAXMINIMASPITCH<br>(largest value in series of minimas of sampled unfiltered pitch values) | 0.67 |
| 11: MAXMAXIMASPITCH<br>(largest value in series of maximas of sampled unfiltered pitch values) | 0.67 |
| 12: MAXPITCH<br>(maximum value of sampled unfiltered pitch values) | 0.67 |
| 13: MINMINIMASPITCH<br>(smallest value in series of minimas of sampled unfiltered pitch values) | 0.59 |
| 14: MEDIANMINIMASPITCH<br>(median value in series of minimas of sampled unfiltered pitch values) | 0.57 |
| 15: MEDIANMAXIMASPITCH<br>(median value in series of maximas of sampled unfiltered pitch values) | 0.57 |
| 16: MINPITCH<br>(minimum value of series of sampled unfiltered pitch values) | 0.52 |
| 17: MEDIANPITCH<br>(median value of series of sampled unfiltered pitch values) | 0.52 |
| 18: MEANMINIMASPITCH<br>(mean value in series of minimas of sampled unfiltered pitch values) | 0.48 |
| 19: MEANMAXIMASPITCH<br>(mean value in series of maximas of sampled unfiltered pitch values) | 0.48 |
| 20: MEANPITCH<br>(mean value of series of sampled unfiltered pitch values) | 0.48 |

This table confirms the great value of the features concerning the first six set of the distribution of intensity values involving the low-passed signals. It also shows something rather surprising: among the 20 most individually informative features, only 3 (the features numbered 12, 16 and 20 in the table) are part of the standard set put forward in psychoacoustic studies (Murray E., Arnott J. L., (1995) "Implementation and testing of a system for producing emotion-by-rule in synthetic speech", Speech Communication, 16(4), pp. 369-390; Sendlmeier and Burkhardt 2000 cited supra; Stevens and Williams 1972 cited supra), or used in most of more application oriented research as in Slaney et al. 1998 cited supra, Breazal 2000 cited supra).

Nevertheless, it must be noted that individual salience of a feature is only partially interesting: it is not rare that success comes from the combination of features. Accordingly, in a first experiment, the Applicant compared a feature set containing only the features 1 to 6 related to low-passed signal intensity (LPF), with a feature set composed of the standard features (SF) used in (Breazal 2000, or Slaney et al. 1998):

1) mean,
2) min,
3) max,
4) max-min,
5) variance of pitch of the unfiltered signal,
6) intensity of unfiltered signal, and
7) mean length of syllabic segments.

(Results are similar if jitter and tremor are added, as sometimes also used).

Table IV summarises these experiments (each number corresponds again to the mean percentage of correct classification in generalisation in 10-fold cross-validation).

TABLE IV comparison between "standard" features and "low-passed signal intensity" features

| Learning schemes | (LPF)sp.1 | (LPF)sp.2 | (SF)sp.1 | (SF)sp.2 |
|---|---|---|---|---|
| 1-NN | 78 | 83 | 70 | 72 |
| 5-NN | 84 | 82 | 72 | 75 |
| 10-NN | 84 | 82 | 73 | 73 |
| Decision Trees/C4.5 | 80 | 84 | 72 | 71 |
| Decision Rules/PART | 78 | 83 | 72 | 74 |
| Kernel Density | 82 | 85 | 71 | 74 |
| Kstar | 80 | 84 | 70 | 72 |
| Linear Regression | 63 | 68 | 72 | 78 |
| LWR | 75 | 71 | 75 | 80 |
| Voted Perceptrons | 51 | 70 | 60 | 58 |
| SVM degree 1 | 63 | 68 | 73 | 78 |
| SVM degree 2 | 71 | 70 | 77 | 50 |
| SVM degree 3 | 76 | 85 | 78 | 82 |
| VFI | 78 | 76 | 64 | 70 |
| M5Prime | 83 | 85 | 76 | 80 |
| Naive Bayes | 82 | 81 | 74 | 72 |
| AdaBoost M1/C4.5 | 80 | 81 | 80 | 78 |
| AdaBoost M1/PART | 80 | 83 | 79 | 78 |

In the above, the abbreviations are as follow: (LPF)sp.1=low-passed signal of speaker 1 voice samples, (LPF)sp.2=low-passed signal of speaker 2 voice samples, (SF)sp.1=standard, non-filtered signal of speaker 1 voice samples, and (SF)sp.2=standard, non-filtered signal of speaker 2 voice samples.

This table shows that use of only the quartiles of the low-passed signal intensity, still outperforms the combination of features used traditionally.

In order to attain the object of finding a very efficient small set of features, the Applicant implemented an automatic search method based on the use of genetic algorithms. Populations of features (limited to 30) were generated and evolved using as fitness the 10-fold cross-validation with two algorithms: Naive Bayes and 5-Nearest Neighbours (chosen mainly because they are fast to train). The exact genetic algorithm is the simple one described in Goldberg, D. E. (1989) "Genetic algorithms in search, optimization and machine learning, reading", MA: Addison-Wesley.

The outcome of this experiment was not obvious: within the selected feature set, there were features related to the quartiles of low-passed signal intensity and features related to the quartiles of pitch, but also features with relatively low individual information gain: those related to the quartiles of the minimas of the unfiltered smoothed intensity curve.

Also, it is again noted that the machine learning algorithm tends to always neglect features related to the variance or the range of distributions, whatever the measurement.

A final experiment using these 15 features along with all learning algorithms was conducted (max, min, median, 3rd quartile and 1st quartile of low-passed signal intensity, pitch and minimas of unfiltered signal intensity).

The results are summarised in table V below.

TABLE V results of learning scheme using the "optimal" feature set

| name | speaker 1 | speaker 2 |
|---|---|---|
| 1-NN | 87 | 92 |
| 5-NN | 90 | 92 |
| 10-NN | 87 | 91 |
| Decision Trees/C4.5 | 85 | 92 |
| Decision Rules/PART | 86 | 93 |
| Kernel Density | 87 | 91 |
| Kstar | 86 | 90 |
| Linear Regression | 83 | 89 |
| LWR | 87 | 89 |
| Voted Perceptrons | 65 | 78 |
| SVM degree 1 | 87 | 91 |
| SVM degree 2 | 90 | 96 |
| SVM degree 3 | 89 | 94 |
| VFI | 83 | 92 |
| M5Prime | 88 | 95 |
| Naive Bayes | 89 | 93 |
| AdaBoost M1/C4.5 | 90 | 96 |
| AdaBoost M1/PART | 90 | 96 |

It can be observed the results obtained are very similar to the best results initially obtained, but with over than 10 times fewer features. Moreover, and interestingly, the variation between learning schemes is less important and algorithms which performed badly, like nearest neighbours or Naive Bayes, now behave more satisfactorily.

When Only Very Few Examples are Provided

In the previous section, large training databases were used: this was optimal to explore feature and algorithmic spaces. However, when dealing with a speaker dependant task, this is not directly applicable to a real world robotic pet, for instance. Indeed, it is not conceivable that the owner of such a robot would give hundreds of supervised examples to teach it how to recognise its way of expressing basic emotions, even though this is what probably happens with human babies and real pets. Indeed, people are generally less inclined to spend such an amount of time with robotic pets.

It then becomes natural to ask what the results become if only very few training examples are given.

To this end, the Applicant produced an experiment using the "optimal" feature set fed earlier, but giving to each algorithms only 12 examples of each class. The algorithms were tested on the remaining items of the database.

This experiment was repeated 30 times with different sets of 12 examples, and results were averaged (the standard deviation was rather low, typically around 1.1).

Table VI summarises the results of the experiment.

TABLE VI results of learning scheme when very few training examples are provided

| learning scheme | speaker 1 | speaker 2 |
|---|---|---|
| 1-NN | 81 | 85 |
| 5-NN | 78 | 74 |
| 10-NN | 68 | 64 |

TABLE VI-continued results of learning scheme when very few training examples are provided

| learning scheme | speaker 1 | speaker 2 |
|---|---|---|
| Decision Trees/C4.5 | 79 | 78 |
| Decision Rules/PART | 79 | 74 |
| Kernel Density | 82 | 84 |
| Kstar | 76 | 68 |
| Linear Regression | 75 | 74 |
| LWR | 75 | 79 |
| Voted Perceptrons | 40 | 51 |
| SVM degree 1 | 81 | 83 |
| SVM degree 2 | 83 | 85 |
| SVM degree 3 | 83 | 85 |
| VFI | 77 | 76 |
| M5Prime | 80 | 79 |
| Naive Bayes | 85 | 87 |
| AdaBoost M1/C4.5 | 79 | 84 |
| AdaBoost M1/PART | 79 | 90 |

It can be observed that some of the algorithms manage to keep a very reasonable level of performance (around 85 percent of success in generalisation). Among them are examples of very cheap algorithms like 1-nearest neighbour or Naive Bayes. These results are rather comparable (and in fact slightly superior) to what is described in Breazal, 2000 cited supra. However, in this case, learning was off-line with a larger database of several female speakers): what is important is that Breazal conducted experiments and showed that this level of success is sufficient to develop interesting interactions with a robotic pet. Also, Breazal showed how these results could be substantially improved when integrated into a larger cognitive architecture which is working in the real world. For example, linking this recognition module to an artificial lymbic/emotional system in which there is some kind of emotional inertia (one very rarely swap from happy to angry in half a second) might give some additional information or tell the system there is uncertainty about the result. As a consequence, the robot may for instance take a posture showing it is not sure of what is happening. The human then will often repeat its utterance with an even more exaggerated intonation.

Conclusions on Overall Studies

From the foregoing, it appears that with the right set of features, reasonable performance can be reached when only few examples are given, which might be the case in "real situation" robots.

An aim is therefore to try to reduce the number of measurements while maintaining an acceptable level of performance, or possibly better. Indeed, some learning algorithms are not well suited to exploiting a large number of measurements, especially when are not all highly relevant. Some learning algorithms are of the constructive type. They are interesting inasmuch as they aim to generate a certain number of rules readable by the developer for classifying emotions. For example, with one or two databases, there is a learning algorithm which identified from the mass of measurements that is there is simply made a test on four chosen values, acceptable results can be obtained.

This allows to discern a certain number of things which appear to be important. These are typically the value of the signal linked to the intensity of the low-passed signal. More particularly, it indicates whether the median of the intensity of that signal is greater than a given value (e.g. 25.75 dB).

An experiment was repeated, by supplying to the learning algorithm only the different quartiles of the intensity of the low passed signal. Measurements show that the best learning algorithms achieve typically 80-85% success (compared with 90-95% for a complete analysis). However, the calculation is greatly simplified, notably by the fact that no pitch analysis is conducted.

On the data base, experiments were made using values traditionally employed in the literature for comparison with either all the values or with the low passed signal intensity. It appears that using the same data base that the values obtained from known choices yield a success rate typically 70-75%. This is around 10% below the results obtained simply by using the low passed signal intensity.

A certain number of experiments were conducted to determine the best compromise between a small number of measurements and the results. This involved generating a large number of measurement groups, e.g. using a genetic algorithm, and analysing the space. The conclusion was that the best results are obtained from the combination of the quartiles of the low passed signal intensity+quartiles of the pitch+the quartiles of the minima of the normal (unfiltered) signal, giving 15 parameters. These success rates in the region of 90-97%, which is substantially the same as the success rate obtained by taking the 120 parameters together.

The next question is to determine whether a robot can generalise relatively well from a relatively small initial number of examples. To this end, an experiment was conducted in which the algorithms were supplied with just twelve examples per class—giving 48 examples in total—to determine to what extent the results would be different. It was observed that differences among the different learning algorithms became more pronounced. However, there are a certain number of standard algorithms which still achieve a success rate in the region of 85-90%.

Figure 9:
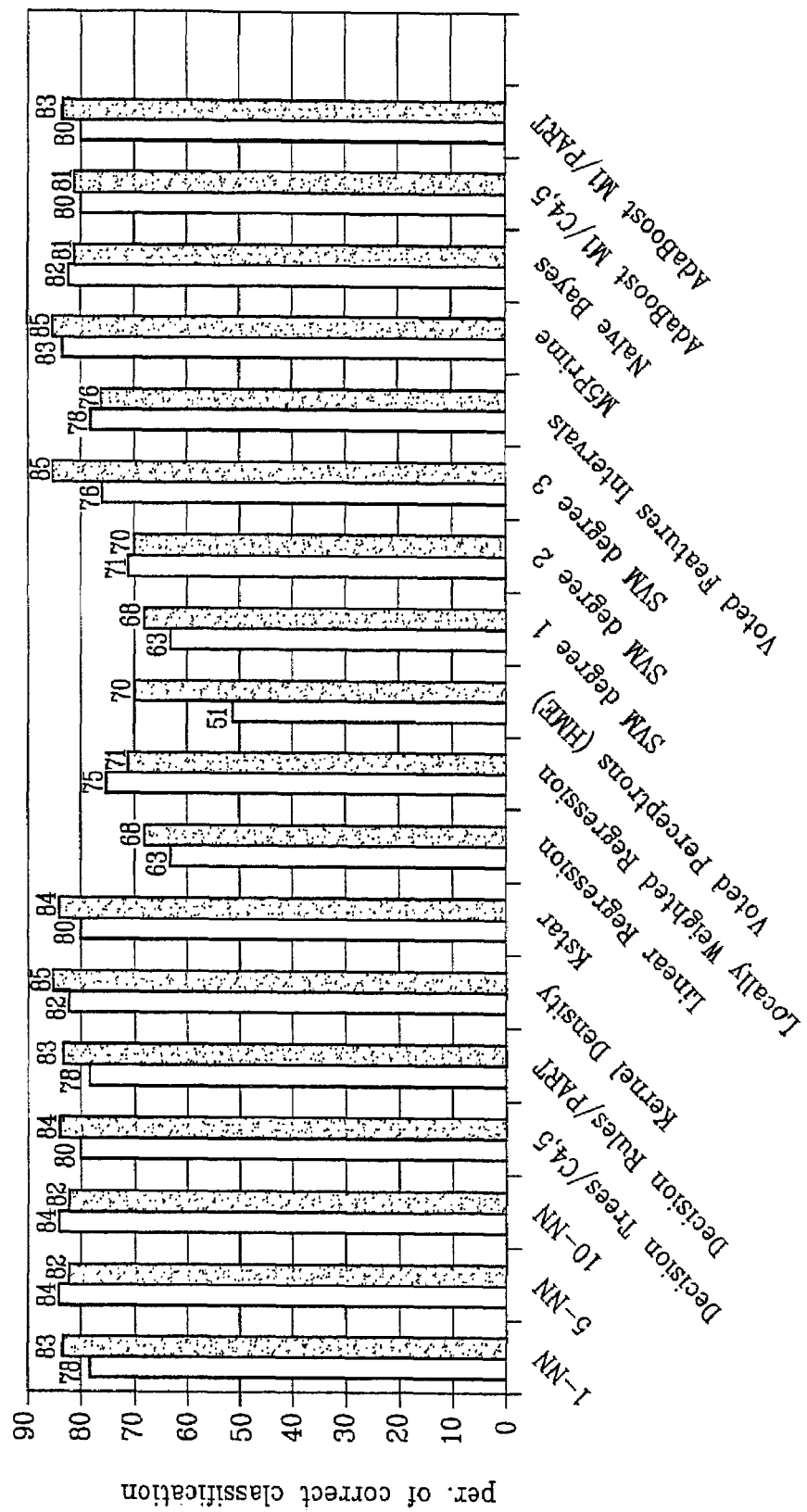
FIGS. 9 to 13 are charts showing the performance of different algorithms used for emotion detection under different conditions and choices of signal features.
Figure 10:
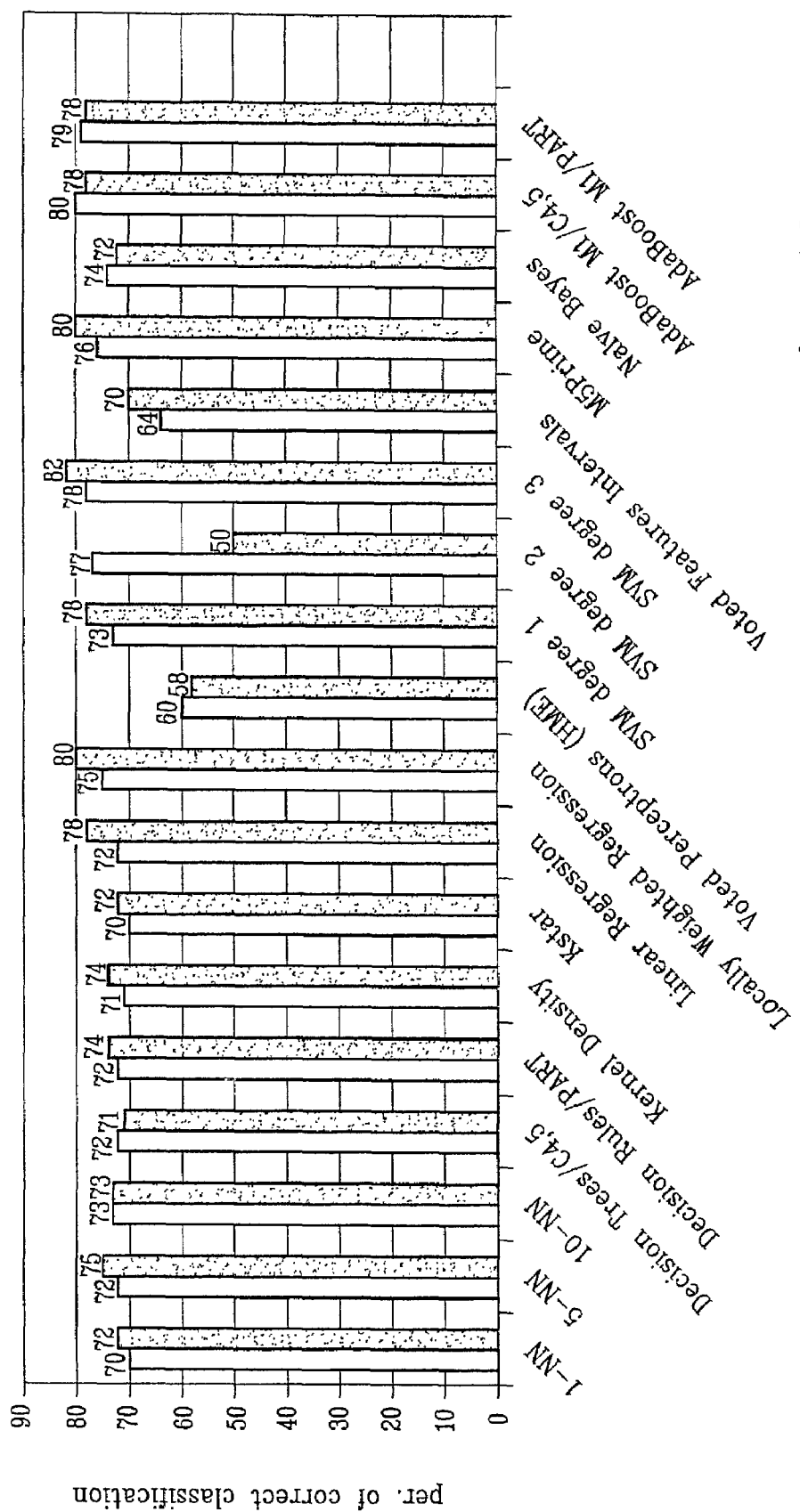
Figure 11:
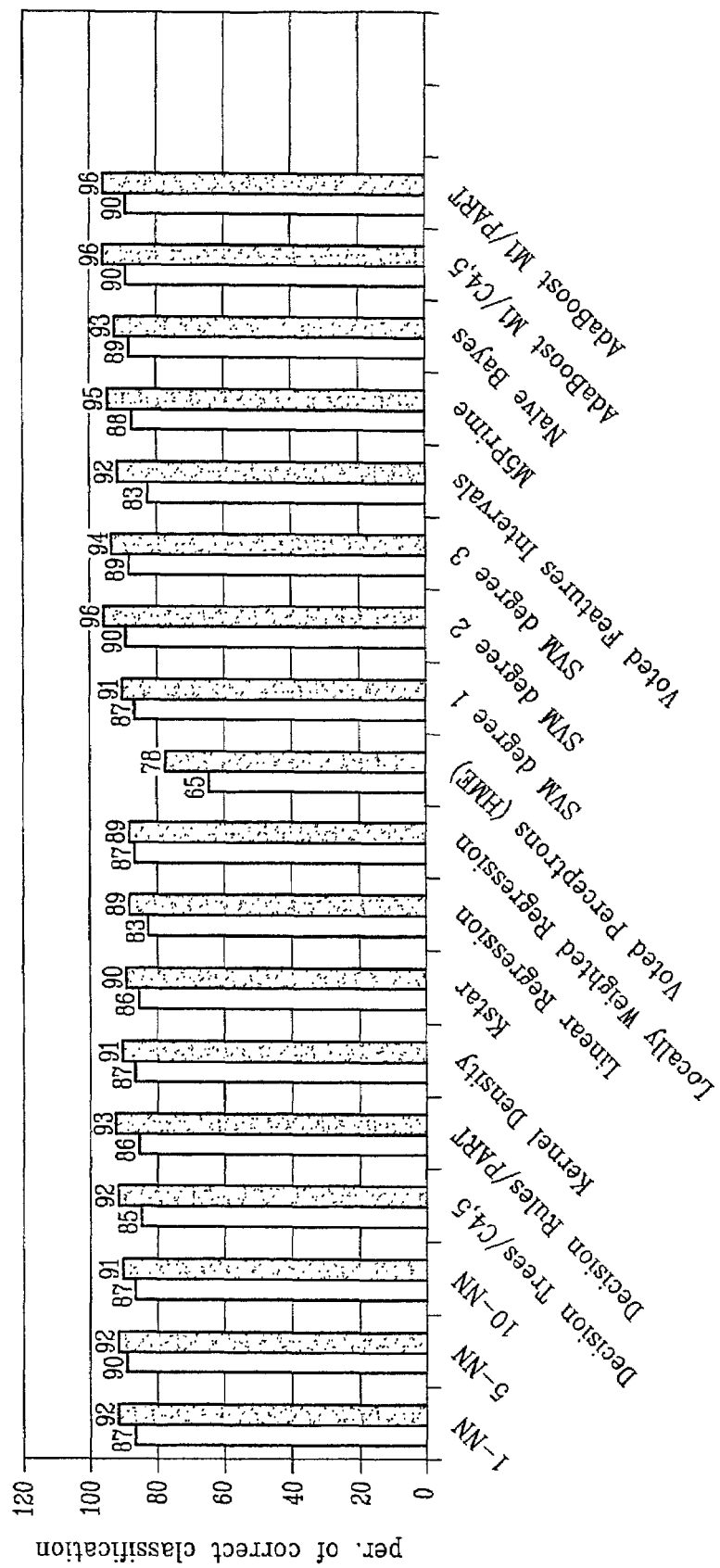
Figure 12:
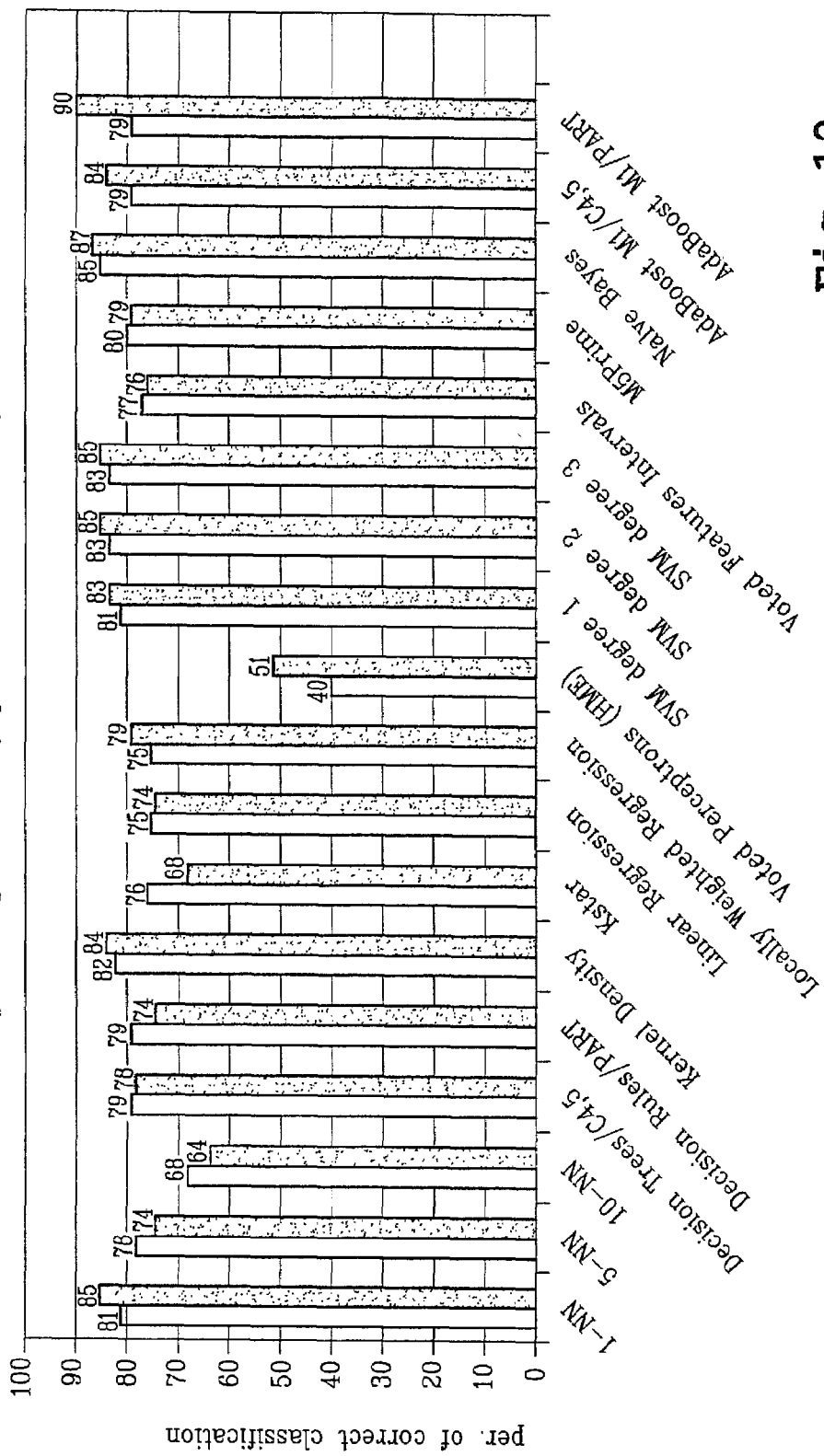
Figure 13:
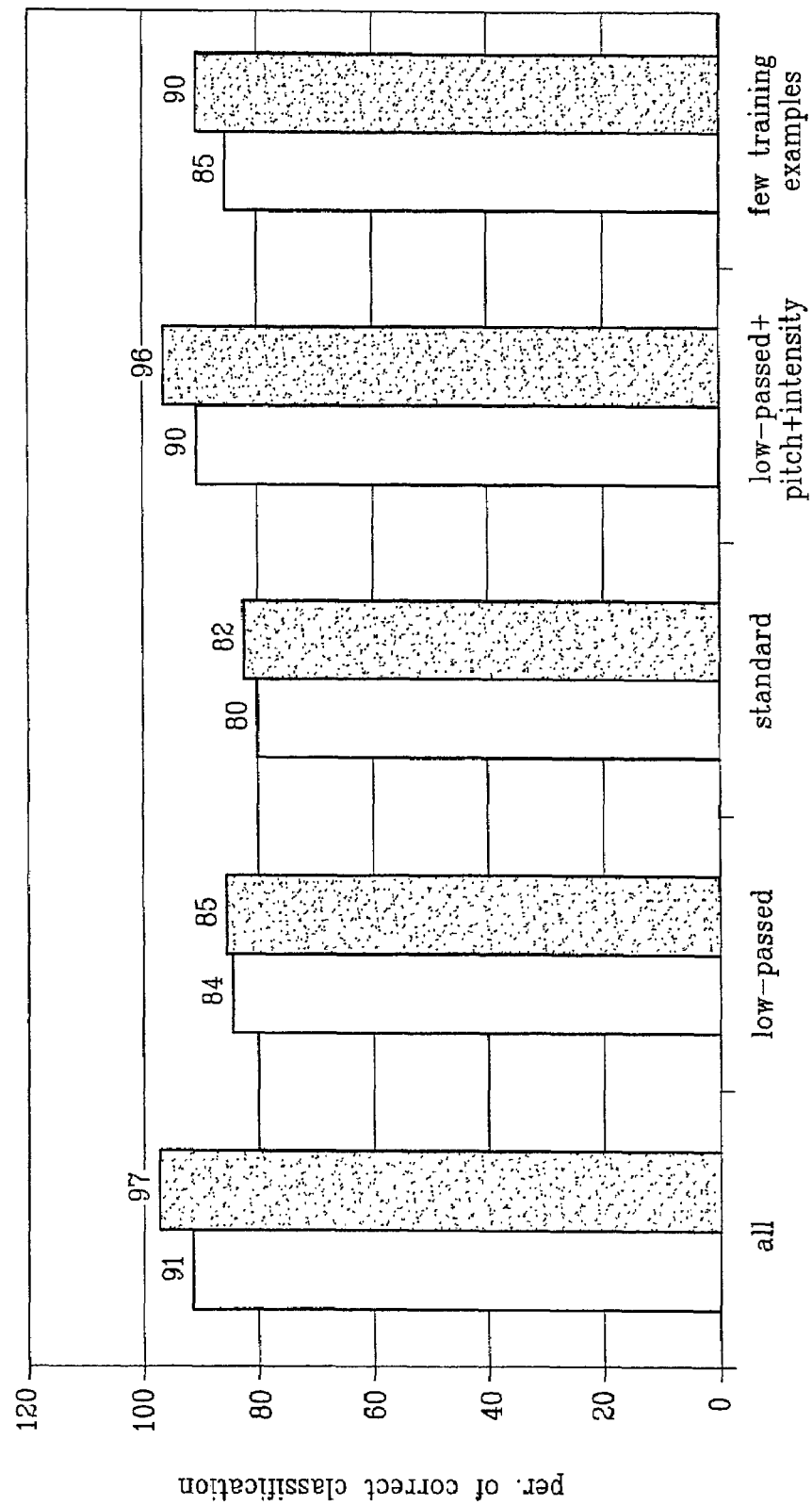

The general results of the study are illustrated by the bar graphs of FIGS. 9 to 13, which compare all the different cited learning algorithms in terms of correct classification of emotion. For each algorithm, two results are indicated, corresponding to each of two respective speakers of the database 8. More particularly:

FIG. 9 shows performance with only low-passed signal intensity, for the correct classification in generalisation from an initial sample. The features are just the low-passed (250 Hz cut-off frequency) signal intensity;

FIG. 10 shows performance with so-called "Kismet" features (Kismet being a system developed by MIT) namely: pitch+intensity+length segments;

FIG. 11 shows performance for the best combination of features: low-passed signal intensity+pitch+minimas intensity;

FIG. 12 show performance when very few samples are available, with the correct classification in generalisation, based on 12 training examples/class. The features used are: low-passed signal intensity+pitch+minimas intensity; and FIG. 13 is a chart summarising the results in terms of the best scores per experiment for each of the preceding charts.

Practical Implementation

Figure 14:
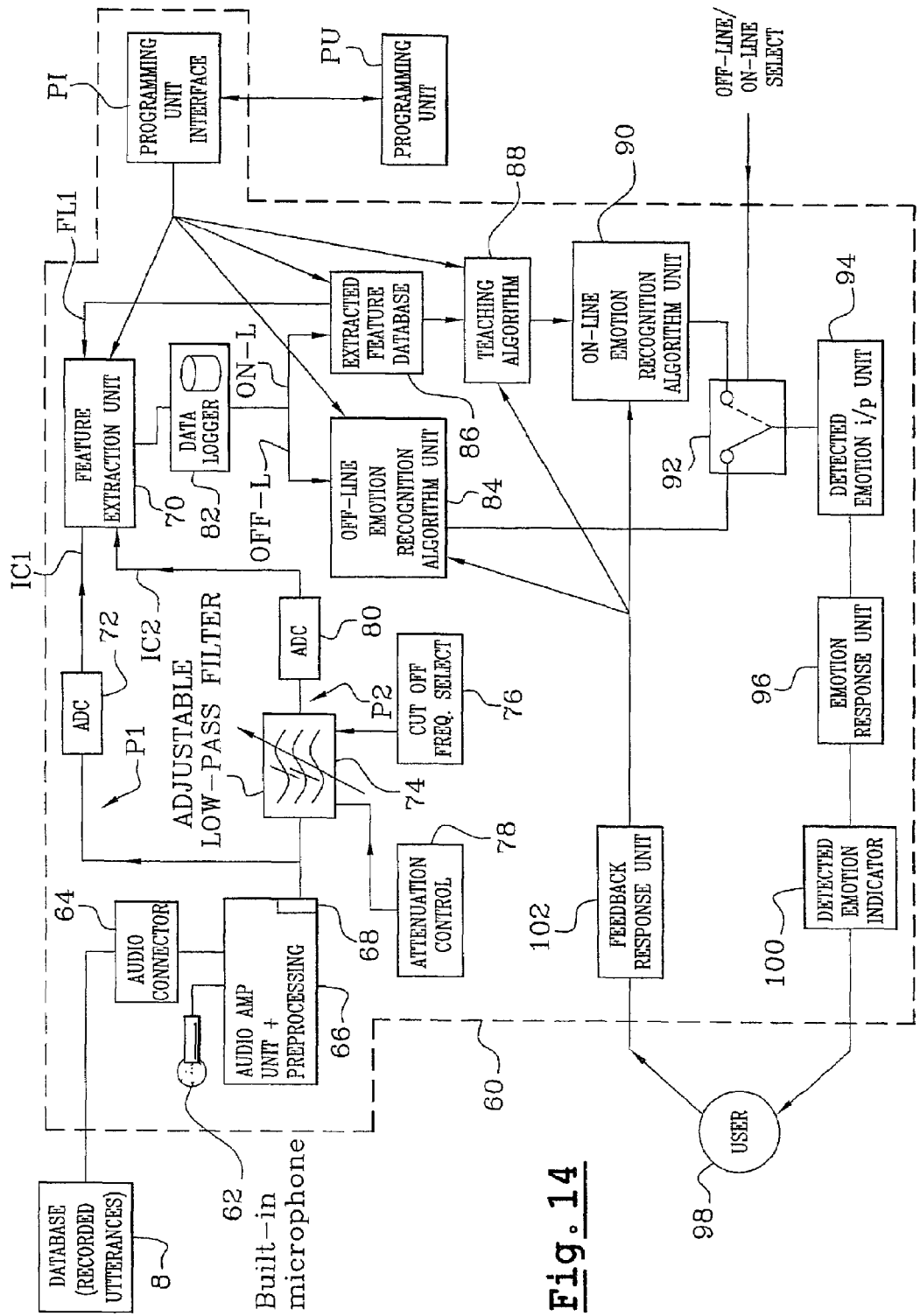
FIG. 14 is a block diagram of an emotion sensitive system implementing a low-pass filtering of voice signals in accordance with the invention.

FIG. 14 illustrates schematically how the findings in accordance with the invention can be implemented in an emotion sensitive system 60. The latter can be part of a robotic pet, humanoid, teaching device, interactive computer or the like. Typically, the system is centred on a microcomputer comprising all the necessary processing, data storage, driving and interfacing functions necessary for the emotion recognition process. As these units are in themselves known and readily adaptable to application requirements by the skilled person, they have been omitted from the diagram for the sake of simplicity.

The system 60 presents an audio input section for receiving voice data from which an emotion is to be detected. The voice data can be obtained from two different sources: a built-in microphone 62 to pick up environmental sounds and thus detect a voice utterance from a nearby person on which to perform emotion detection, as in a real-life situation, and a database of recorded utterances, which can interface with the system 60 via an audio connector 64. The database can simply be the database 8 of FIG. 3, or an adapted version thereof. In this way, the system can be pre-trained, corrected, characterised, etc. This interfacing possibility is also useful to set up all the internal sound processing parameters, including the low-pass filtering characteristics.

The voice signals from either of the two sources 62 and 8 are fed to an audio amplification and preprocessing unit 66 which adapts the signal levels to the system electronics. The unit 66 may also include some noise reduction stages to reduce background noise to a minimum when the microphone 62 is in operation. The audio output 68 of unit 66 is fed along first and second paths P1 and P2 to two respective first and second channel inputs IC1 and IC2 of a feature extraction unit 70.

The first path P1 contains a first digital-to-analog converter (DAC) 72 between the audio output 68 and the first channel input IC1. The latter then simply receives the suitably digitised form of the amplified and preprocessed audio signal.

The second path P2 contains a low-pass filter 74 whose input is connected to the audio output 68. In the example, the low-pass filter is similar to the filter 18 of FIG. 3, inasmuch as it has an adjustable cut-off frequency. Typically, the cut-off frequency (Fco) is set by default to pass signals from a frequency range of 0 to 250 Hz, with a rapid attenuation after that frequency. The cut-off frequency can be set to different values by means of a cut-off frequency selector 76. The latter can be manually controlled by means of a slider to produce different cut-off frequencies, and/or electronically adjusted by internal control circuitry, e.g. in feedback system to obtain optimal results during a characterisation phase. The typical range of possible values for the cut-off frequency Fco is from 150 Hz to 400 Hz. The adjustment in the cut-off frequency can be necessary to optimise the system 60 to different speakers, languages, environments, varieties of emotions to detect, etc.

The low-pass filter 74 further includes a variable attenuation control device 78 which allow the slope of the frequency response curve (cf. FIG. 4) to be modified, e.g. by changing the order of the filter, to allow a further degree of freedom in optimising the low-pass filtering characteristics.

However, the filter 74 need not be variable, nor have an adjustable slope, and simpler embodiments can be envisaged with a fixed low-pass filter set at a predetermined cut-off frequency, e.g. 250 Hz.

As for the system of FIG. 3, the low-pass filter 74 can be implemented with analog circuitry (passive or active), or as a digital filter. In the latter case, the DAC 80 is no longer necessary, but a similar DAC would be provided at its input, unless the digital low-pass filter comprises its own digital-to-analog converter stage. In a practical implementation, the low-pass filter 74 and its control units 76 and 78 would be typically fully digital such that the control of filter characteristics, including of selection of cut-off frequency are accessible digitally via an interface of a PC based control unit at the heart of the system 60.

The low-passed signal output from the low-pass filter 74 (analog in the figure) is supplied to a second analog-to-digital converter 80 which supplies the suitably digitised low-pass filtered signal to the second channel input IC2 of the feature extraction unit 70.

The latter forms the first link in a processing chain whose function is to detect an emotion conveyed by inputted voice signals.

The first part of the processing chain comprises the feature extraction unit 70, which is programmed to extract a selection of features from the digitised signal, of which some are to be extracted from the voice signal after low pass filtering (at channel input IC2) in accordance with the invention.

The feature extraction unit 70 operates in a manner analogous to the feature measurement station 30 of FIG. 3. In particular, it selectively extracts a set of features taken from the 120 features described supra, i.e. obtained from the possible combinations of:

i) the intensity of the signal after low-pass filtering (derived from the signal at channel IC2), ii) the intensity of the signal without low-pass filtering (derived from the signal at channel IC1), and iii) the pitch of the signal without low-pass filtering (derived from the signal at channel IC1).

A 10 Hz smoothing of the above signals is performed.

From that stored 10 Hz smoothed signal are computed each of the three time-varying signals i) to iii) mentioned above.

Each thus-computed signal i) to iii) is digitally sampled at e.g. 0.01 second intervals. Each sampling gives an absolute instantaneous value of the intensity (signals i) and ii))) or of the pitch (signal iii)).

For each sampled signal, there is thus obtained a sequence of sampled values, typically a few hundred, given that a phrase is a few seconds long. The thus-obtained sequences of values are stored in time order, starting from the value of the earliest part of the signal, so that the sequence of values expresses the time variation of signal i), ii) or iii) considered.

For each sequence obtained from each of these three signals: intensity after low-pass filtering, intensity without low-pass filtering and pitch without low-pass filtering, the feature extraction unit 70 can calculate the four series of values described above in connection with the feature measurement station 30 of FIG. 3, i.e.

1) The series of local minimas, by determining the values in the sequence that correspond to a minima and constructing a series formed just of these minima values of the sequence. The series is stored in time order, starting from the earliest minima. A minima in the sequence of values is identified as a member of the sequence whose value is less than that of its neighbour immediately before and immediately after in the sequence.

2) The series of local maximas, by determining the values in the sequence that correspond to a maxima and constructing a series formed just of these maxima values of the sequence. The series is stored in time order, starting from the earliest maxima. A maxima in the sequence of values is identified as a member of the sequence whose value is greater than that of its neighbour immediately before and immediately after in the sequence.

3) The series of durations (time intervals) between local (adjacent) extremas—minimas and maximas—(which models rhythmic aspects of the signal) by identifying in the sequence the values that correspond to a minima or a maxima. This is achieved by comparing each value with its immediately adjacent neighbours as for series 1) and 2) above. Then, the positions in time of the identified extremas are analysed to determine the time intervals separating successive extrema. These time intervals are set out in a series, starting from the interval separating the earliest and next earliest extremas, to yield the series of time intervals.

4) The series itself, by forming a series from all the successive sampled values of the sequence, starting from the beginning of the sampled voice signal.

On the resulting 3×4 (=12) possible series, the feature extraction unit can perform the following 10 statistical operations to produce corresponding features:

1) the mean,
2) the maximum (i.e. the overall highest value),
3) the minimum (i.e. the overall lowest vale),
4) the difference between the maximum and the minimum,
5) the variance,
6) the median,
7) the first quartile,
8) the third quartile,
9) the interquartile range, defined as the difference between the third and first quartiles,
10) the mean of the absolute value of the local derivative.

Naturally, some of the above statistical features involve a re-ordering of the values in the series from a time developing series to a series sorted by increasing value, notably to determine the first quartile, median and third quartile.

All the data are initially normalised before calculating these statistical characteristics.

The choice of which of these 120 features are to be extracted depends on the algorithms to be used, and is programmable. In the embodiment, the feature extraction unit 70 can be programmed to extract any number of these features according to requirements. At least one of the features is derived from an intensity of a low-pass filtered voice signal on which an emotion recognition is to be performed.

As an example, the feature extraction unit 70 can be programmed to extract at least one the following five statistical features among the ten listed above:

the first quartile,
the median,
the third quartile,
the maximum, and
the minimum.

This extraction can be performed for one or a mix of all three signals i), ii, and iii) listed above, giving up to 15 features that can extracted by unit 70 for each voice signal from which an emotion is to be detected, at least one of the features being extracted from a low-passed intensity signal.

Also, the extraction unit 70 can be additionally programmed to extract any one of features listed 1 to 10 above from the pitch signal extracted from the voice signal after low-pass filtering. In this case, for the thus-obtained low-pass filtered pitch, there can be obtained the same four series of values listed 1 to 4 above, each giving rise to the ten statistical features listed 1 to 10 above. Thus, the extraction unit can further be programmed to extract any number up to 4×10=40 statistical features from the pitch signal, derived after low pass filtering by filter 74.

The feature extraction unit 70 can also be programmed to extract a reduced number of statistical features which correspond e.g. to at least one of the first six features listed in table III above, i.e.:

1: the median value of sampled low-pass filtered signal intensity values,

2: the mean value of low-pass filtered signal intensity values,

3: third quartile value of series of sampled low-pass filtered signal intensity values, 4: the first quartile value of series of sampled low-pass filtered signal intensity values, 5: the maximum value of series of sampled low-pass filtered signal intensity values, and 6: the maximum value of series of sampled low-pass filtered signal intensity values.

Finally, each of the signals listed i) to iii) and—as the case arises—the low-pass filtered pitch signal can be individually programmed to be smoothed, e.g. by 10 Hz smoothing (or some other value), or not smoothed.

The extracted features are temporarily stored in a data logger 82 where they can be accessed by other functional units.

The emotion sensitive system 60 is configured to operate selectively in one of two possible modes, these being respectively off-line training emotion recognition and on-line training emotion recognition.

In the off-line training mode, the training to detect emotions is conducted outside the device, e.g. using the evaluation system as described with reference to FIG. 3. In this case, the programming unit PU of FIG. 3 delivers a complete emotion detection algorithm ready for use. The algorithm can be of the type set out in example 1, for instance, or some quite different algorithm. The emotion recognition can be frozen in its parameters and programming (closed algorithm), or it can be adaptable to some degree to update its parameters and programming on the basis of user feedback response to correct errors or to coach in emotion detection.

In the on-line training mode, there is no initial set emotion recognition algorithm. Rather, there is provided a teaching algorithm which analyses the different features extracted from the feature extraction unit 70 and user feedback, or user indications of the emotions that are to be detected. From this input, the teaching algorithm develops an specific on-line emotion recognition algorithm, which can be continually modified, updated and improved with growing user input and feedback.

In FIG. 14, each of these two modes has its own path of functional units: OFF-L and ON-L respectively for the off-line and on-line modes.

For the off-line mode, there is provided an off-line emotion recognition algorithm unit 84 as mentioned above. The latter inputs the features extracted by unit 70, as present in the data logger 82 in accordance with its parameterisation and programming, and determines from these extracted features an emotion in accordance with its own predetermined settings. In this mode, the voice signals will normally only come from the microphone 62.

For the on-line training mode, there is first constituted a database 86 containing extracted features from which different choices can be investigated by a learning algorithm unit 88. To this end, the database 86 is connected to the data logger 82 so as to accumulate all the extracted features and thus build a corresponding collection of extracted features. A feedback (loop FL1) from the learning algorithm unit 86 to the feature extraction unit 70 allows the latter to be instructed to change or select new features from the possibilities, in order to meet new needs deriving the most appropriate emotion detection algorithm. The teaching algorithm unit 88 can include a program allowing a user to input voice messages with different emotions, or be coupled to receive data from the a database of voices, such as database 8.

Once the teaching algorithm unit 86 has developed the required on-line emotion recognition algorithm, the latter is loaded into an on-line emotion recognition algorithm unit 90. The latter performs the same emotion recognition as that of unit 84, but is produced internally and specifically tailored to a given speaker, such as the user.

The types of emotion detected by either of the emotion detection algorithm units 84 or 90 can be as discussed earlier: calm, sad, happy, angry. Other emotions can of course be accommodated.

The choice of operation in the off-line or on-line is determined by a selector 92 which selects from which emotion detection algorithm 84 or 90 the detected emotions are to be taken. The selection is through an external user input signal 94.

Naturally, the following variants are possible:
 the system 60 is provided only with an off-line emotion recognition algorithm 84. The latter can then be totally rigid, or adaptable to a certain degree through feedback response, or
 the system is provided only with an on-line emotion algorithm system composed of the teaching algorithm and the on-line emotion recognition algorithm produced by the latter (units 86 to 90).

The programming unit PU of FIG. 3 serves to supply the required information and code for the different functional units. This is achieved through a programming interface PI. In particular, the programming unit PU and its interface PI serve to program the feature extraction unit 70, load the off-line emotion recognition algorithm (unit 84), and/or the teaching algorithm (unit 88), as well as features to database 86 in order to provide additional samples or complementary data.

The output from one or the other of the off-line and on-line emotion recognition algorithm units 84 and 90 is delivered to a detected emotion input unit 94 where the recognised emotion is acknowledged. From that unit 94, the detected emotion is delivered to an emotion response unit 96 for governing all the intended emotional responses. For instance, in the case of a robotic pet, the emotional response unit 96 will command the operation of different electromechanical actuators, lights and audio output devices to simulate an appropriate response.

One response includes giving feedback to the human user 98 or any other controlling person or device to indicate the detected information. This is achieved through a detected emotion indicator 100 which delivers a visual, aural, electrical or mechanical signal indicative of the detected emotion. This makes it possible to check if the identification is correct or not and to take corrective measures as appropriate.

In particular, it allows the user 98 to express a feedback response to a feedback response unit 102 that produces the suitable feedback messages to the various units concerned: off-line emotion recognition algorithm unit 84 (if the latter allows some flexibility), teaching algorithm unit 88, and on-line emotion recognition algorithm unit 90.

From the foregoing, it is clear that the invention can be implemented with many different combinations of features extracted from the signal, at least one feature being extracted from the signal after low-pass filtering.

The choice of algorithm for the emotion detection on the basis of these features can be made on an empirical basis. The algorithms cited in this specification are just some of many algorithms suitable for that purpose. It can also be envisaged to implement the invention with other algorithms, both for teaching and for emotion detection.

The invention claimed is:

1. A method of detecting an emotion conveyed in a voice signal, comprising the sequential steps of:
 low-pass filtering said voice signal,
 extracting a set comprising at least one prosodic feature of sound properties derived entirely from said filtered signal, wherein said low-pass filtering step comprises filtering the intensity of said voice signal with a cut-off frequency (Fco) in the range of 150 to 400 Hz, and processing said set of extracted feature(s) to detect an emotion therefrom.

2. Method according to claim 1, wherein said cut-off frequency (Fco) is in the range of 250 to 300 Hz.

3. Method according to claim 2, wherein said cut-off frequency (Fco) is equal to 250 Hz.

4. Method according to claim 1, wherein the feature extracting step comprises the steps of selectively extracting one or more among 160 features obtained from the following combination of parameters I, II, and III:

Parameters I: i) the intensity of the signal derived after said low-pass filtering step, ii) the intensity of the signal without low-pass filtering, iii) the pitch of the signal without low-pass filtering, and iv) the pitch of the signal derived after said low-pass filtering step;

Parameters II, from a sequence of values of a parameter I obtained over a duration of said voice signal: 1) a series of local minimas, whose members are values in said sequence that correspond to a minima, 2) a series of local maximas, whose members are values in said sequence that correspond to a maxima, 3) a series of durations (time intervals), whose members are time values separating local extremas, and 4) a series, whose members are all the successive sampled values of the sequence; and Parameters III, calculated from a series of statistical operations on parameter II: 1) the mean, 2) the maximum, 3) the minimum, 4) the difference between the maximum and the minimum, 5) the variance, 6) the median, 7) the first quartile, 8) the third quartile, 9) the interquartile range, defined as the difference between the third and first quartiles, 10) the mean of the absolute value of the local derivative; at least one of said features originating from: i) the intensity of the signal after said low-pass filtering step or from iv) the pitch of the signal after low-pass filtering step of parameters I.

5. Method according to claim 4, wherein said parameters I comprise: i) the intensity of the signal derived after said low-pass filtering step, ii) the intensity of the signal without low-pass filtering, and iii) the pitch of the signal without low-pass filtering, whereby said combination yields a total of 120 different possible features; at least one of said features originating from: i) the intensity of the signal after said low-pass filtering step of parameters I.

6. Method according to claim 4, wherein said parameters III comprise the following five parameters: 2) the maximum, 3) the minimum, 6) the median, 7) the first quartile, 8) the third quartile, whereby said combination yields a total of 80 different possible features.

7. Method according to claim 6, wherein said extracting step comprises extracting at least one of the following possible features: the maximum, the minimum, the median, the first quartile, the third quartile, calculated from: the series of values of the intensity signal derived after said low-pass filtering of the voice signal, the series of minimum values of the intensity signal derived without low-pass filtering the voice signal, the series of pitch values of the signal derived after low-pass filtering of the voice signal, and the series of pitch values of the signal derived without low-pass filtering of the voice signal.

8. Method according to claim 1, wherein said extracting step comprises extracting features derived from both said voice signal after said low-pass filtering step and from said voice signal without low-pass filtering.

9. Method according to claim 1, wherein said extracting step comprises extracting features only from said voice signal after said low-pass filtering step.

10. Method according to claim 1, wherein said at least one member of said set of features comprises:

the median value of signal intensity values derived after low-pass filtering the voice signal, the mean value of the signal intensity values derived after low-pass filtering the voice signal, third quartile value of the signal intensity values derived after low-pass filtering the voice signal, the first quartile value of the signal intensity values derived after low-pass filtering the voice signal, the maximum of the signal intensity values derived after low-pass filtering the voice signal, and the maximum value of the series of signal intensity values derived after low-pass filtering the voice signal.

11. Method according to claim 1, further comprising a step of smoothing a signal extracted from said voice signal prior to said extracting step.

12. Method according to claim 1, further comprising a step of generating an emotion detecting algorithm using a teaching algorithm, said teaching algorithm exploiting said at least one feature extracted from a low-pass filtered voice signal.

13. Method according to claim 12, further comprising a step of programming (PU) an emotion detection device with an off-line emotion detection algorithm and/or an on-line emotion detection algorithm, whereby said algorithms exploit at least one feature extracted from a low-pass filtered voice signal.

14. A device for detecting an emotion conveyed in a voice signal, comprising:

low-pass filter means for filtering said voice signal, wherein said low-pass filtering means has a cut-off frequency (Fco) in the range of 150 to 400 Hz, extracting means for extracting a set comprising at least one prosodic feature of sound properties derived entirely from said filtered signal, processing means for processing said set of extracted feature(s) to detect an emotion therefrom.

15. Device according to claim 14, wherein said cut-off frequency (Fco) is in the range of 250 to 300 Hz.

16. Device according to claim 15, wherein said cut-off frequency (Fco) is equal to 250 Hz.

17. Device according to claim 14, wherein the feature extracting means comprises means for selectively extracting one or more among 160 features obtained from the following combination of parameters I, II, and III:

Parameters I: i) the intensity of the signal derived after said low-pass filtering step, ii) the intensity of the signal without low-pass filtering, iii) the pitch of the signal without low-pass filtering, and iv) the pitch of the signal derived after said low-pass filtering step;

Parameters II, from a sequence of values of a parameter I obtained over a duration of said voice signal: 1) a series of local minimas, whose members are values in said sequence that correspond to a minima, 2) a series of local maximas, whose members are values in said sequence that correspond to a maxima, 3) a series of durations (time intervals), whose members are time values separating local extremas, and 4) a series, whose members are all the successive sampled values of the sequence; and Parameters III, calculated from a series of statistical operations on parameter II: 1) the mean, 2) the maximum, 3) the minimum, 4) the difference between the maximum and the minimum, 5) the variance, 6) the median, 7) the first quartile, 8) the third quartile, 9) the interquartile range, defined as the difference between the third and first quartiles, 10) the mean of the absolute value of the local derivative; at least one of said features originating from: i) the intensity of the signal after said low-pass filtering step or from iv) the pitch of the signal after low-pass filtering step of parameters I.

18. Device according to claim 14, wherein said extracting means is set to extract features derived from both said voice signal after said low-pass filtering means and from said voice signal without low-pass filtering.

19. Device according to claim 14, wherein said extracting means are set to extract features only from said voice signal after said low-pass filtering means.

20. Device according to claim 14, wherein said at least one member of said set of features comprises:
the median value of signal intensity values derived after low-pass filtering the voice signal,
the mean value of the signal intensity values derived after low-pass filtering the voice signal,
third quartile value of the signal intensity values derived after low-pass filtering the voice signal,
the first quartile value of the signal intensity values derived after low-pass filtering the voice signal,
the maximum of the signal intensity values derived after low-pass filtering the voice signal, and
the maximum value of the series of signal intensity values derived after low-pass filtering the voice signal.

21. Device according to claim 14, further comprising means for smoothing a signal extracted from said voice signal prior to said extracting means.

22. Device according to claim 14, wherein said processing means comprises an off-line emotion recognition algorithm unit containing a preprogrammed algorithm.

23. Device according to claim 14, wherein said processing means comprises an on-line emotion recognition algorithm unit, said device further comprising a teaching algorithm unit for producing an emotion recognition algorithm in response to data produced said extracting means.

24. A voice signal processing device specifically for the device according to claim 14, low-pass filtering means for supplying a low-passed form of said voice signal to said extracting means.

\* \* \* \* \*

UNITED STATES PATENT AND TRADEMARK OFFICE
CERTIFICATE OF CORRECTION

| | | |
|---|---|---|
| PATENT NO. | : 7,451,079 B2 | Page 1 of 1 |
| APPLICATION NO. | : 10/194848 | |
| DATED | : November 11, 2008 | |
| INVENTOR(S) | : Oudeyer | |

It is certified that error appears in the above-identified patent and that said Letters Patent is hereby corrected as shown below:

On the cover page,

[*] Notice:    Subject to any disclaimer, the term of this patent is extended or adjusted under 35 USC 154(b) by (890) days Delete the phrase "by (890) days" and insert -- by 1189 days --

Signed and Sealed this

Eighteenth Day of May, 2010

David J. Kappos
*Director of the United States Patent and Trademark Office*